(12) United States Patent
Jarvis et al.

(10) Patent No.: US 10,169,822 B2
(45) Date of Patent: Jan. 1, 2019

(54) INSURANCE RATE OPTIMIZATION THROUGH DRIVER BEHAVIOR MONITORING

(71) Applicants: Brad Jarvis, Newport Beach, CA (US); Richard Frank Pearlman, Carlsbad, CA (US); Sean Michael Walsh, Redwood City, CA (US); Daris Amon Schantz, Scottsdale, AZ (US); Steven Gertz, Smyrna, GA (US); Alec Michael Hale-Pletka, La Palma, CA (US)

(72) Inventors: Brad Jarvis, Newport Beach, CA (US); Richard Frank Pearlman, Carlsbad, CA (US); Sean Michael Walsh, Redwood City, CA (US); Daris Amon Schantz, Scottsdale, AZ (US); Steven Gertz, Smyrna, GA (US); Alec Michael Hale-Pletka, La Palma, CA (US)

(73) Assignee: Spireon, Inc., Irvine, CA (US)

( * ) Notice: Subject to any disclaimer, the term of this patent is extended or adjusted under 35 U.S.C. 154(b) by 1044 days.

(21) Appl. No.: 14/490,694

(22) Filed: Sep. 19, 2014

(65) Prior Publication Data

US 2015/0006207 A1    Jan. 1, 2015

Related U.S. Application Data

(63) Continuation-in-part of application No. 14/022,241, filed on Sep. 10, 2013, which is a continuation-in-part
(Continued)

(51) Int. Cl.
*G06Q 40/08*    (2012.01)
*G06Q 30/02*    (2012.01)
(Continued)

(52) U.S. Cl.
CPC ....... *G06Q 40/08* (2013.01); *G06Q 10/06398* (2013.01); *G06Q 10/0833* (2013.01);
(Continued)

(58) Field of Classification Search
CPC ..................................................... G06Q 40/08
(Continued)

(56) References Cited

U.S. PATENT DOCUMENTS

| 4,067,061 | A | 1/1978 | Juhasz |
| 4,633,407 | A | 12/1986 | Freienstein et al. |

(Continued)

FOREIGN PATENT DOCUMENTS

| CA | 2609106 A1 | 10/2008 |
| CA | 2688263 A1 | 12/2008 |

(Continued)

OTHER PUBLICATIONS

The course of the Connected Car, , titled "the coruse of the electric car" Jan. 6, 2013 , attached 4 page NPL, Jan.-Feb. edition (Year: 2013)*

(Continued)

*Primary Examiner* — Bruce I Ebersman
(74) *Attorney, Agent, or Firm* — Ludeka Neely Group. P.C.

(57) ABSTRACT

Disclosed are a method and/or a system of insurance rate optimization through driver behavior which includes a computer server of the driver monitoring environment to determine if a newly insured driver operating a private vehicle is adhering to a set of parameters set by an entity i.e. a driving school, an insurance provider and/or a family member of the newly insured driver. The system assigns a credit to the newly insured driver when it adheres to the set of parameters. The newly insured driver is monitored by the entity. A metadata is generated which includes a behavioral trait of (Continued)

the newly insured driver and an insurance rate is set through the insurance provider based on an adherence to the set of parameters set by the entity.

12 Claims, 15 Drawing Sheets

Related U.S. Application Data of application No. 13/941,471, filed on Jul. 13, 2013, which is a continuation of application No. 13/421,571, filed on Mar. 15, 2012, now Pat. No. 8,510,200, application No. 14/490,694, which is a continuation-in-part of application No. 13/328,070, filed on Dec. 16, 2011, and a continuation-in-part of application No. 13/310,629, filed on Dec. 2, 2011.

(51) Int. Cl.
*G06Q 10/06* (2012.01)
*G09B 19/14* (2006.01)
*H04Q 9/00* (2006.01)
*G06Q 10/08* (2012.01)

(52) U.S. Cl.
CPC ..... *G06Q 30/0207* (2013.01); *G06Q 30/0271* (2013.01); *G09B 19/14* (2013.01); *H04Q 9/00* (2013.01); *H04Q 2209/50* (2013.01); *H04Q 2209/80* (2013.01); *H04Q 2209/86* (2013.01)

(58) Field of Classification Search
USPC .......................................................... 705/4
See application file for complete search history.

(56) References Cited

U.S. PATENT DOCUMENTS

| | | |
|---|---|---|
| 4,654,821 A | 3/1987 | Lapp |
| 4,663,725 A | 5/1987 | Truckenbrod et al. |
| 4,675,539 A | 6/1987 | Nichol |
| 4,695,946 A | 9/1987 | Andreasen et al. |
| 4,701,845 A | 10/1987 | Andreasen et al. |
| 4,727,360 A | 2/1988 | Ferguson et al. |
| 4,837,700 A | 6/1989 | Ando et al. |
| 4,884,242 A | 11/1989 | Lacy et al. |
| 4,891,650 A | 1/1990 | Sheffer |
| 4,907,150 A | 3/1990 | Arroyo et al. |
| 5,119,301 A | 6/1992 | Shimizu et al. |
| 5,122,959 A | 6/1992 | Nathanson et al. |
| 5,208,756 A | 5/1993 | Song |
| 5,218,367 A | 6/1993 | Sheffer et al. |
| 5,223,844 A | 6/1993 | Mansell et al. |
| 5,276,865 A | 1/1994 | Thorpe |
| 5,289,369 A | 2/1994 | Hirshberg |
| 5,299,132 A | 3/1994 | Wortham |
| 5,307,277 A | 4/1994 | Hirano |
| 5,390,125 A | 2/1995 | Sennott et al. |
| 5,408,411 A | 4/1995 | Nakamura et al. |
| 5,424,952 A | 6/1995 | Asayama |
| 5,457,439 A | 10/1995 | Kuhn |
| 5,515,419 A | 5/1996 | Sheffer |
| 5,521,579 A | 5/1996 | Bernhard |
| 5,610,815 A | 3/1997 | Gudat et al. |
| 5,684,474 A | 11/1997 | Gilon et al. |
| 5,686,888 A | 11/1997 | Welles, II et al. |
| 5,708,820 A | 1/1998 | Park et al. |
| 5,712,789 A | 1/1998 | Radican |
| 5,751,245 A | 5/1998 | Janky et al. |
| 5,805,103 A | 9/1998 | Doi et al. |
| 5,867,804 A | 2/1999 | Pilley et al. |
| 5,870,029 A | 2/1999 | Otto et al. |
| 5,877,956 A | 3/1999 | Frank et al. |
| 5,917,433 A | 6/1999 | Keillor et al. |
| 5,923,243 A | 7/1999 | Bleiner |
| 5,949,974 A | 9/1999 | Ewing et al. |
| 5,978,236 A | 11/1999 | Faberman et al. |
| 6,029,111 A | 2/2000 | Croyle |
| 6,067,044 A | 5/2000 | Whelan et al. |
| 6,075,441 A | 6/2000 | Maloney |
| 6,091,323 A | 7/2000 | Kawai |
| 6,148,291 A | 11/2000 | Radican |
| 6,154,152 A | 11/2000 | Ito |
| 6,181,029 B1 | 1/2001 | Berglund et al. |
| 6,202,023 B1 | 3/2001 | Hancock et al. |
| 6,204,764 B1 | 3/2001 | Maloney |
| 6,226,389 B1 | 5/2001 | Lemelson et al. |
| 6,233,563 B1 | 5/2001 | Jefferson et al. |
| 6,240,365 B1 | 5/2001 | Bunn |
| 6,249,217 B1 | 6/2001 | Forbes |
| 6,266,008 B1 | 7/2001 | Huston et al. |
| 6,275,773 B1 | 8/2001 | Lemelson et al. |
| 6,317,693 B2 | 11/2001 | Kodaka et al. |
| 6,338,011 B1 | 1/2002 | Furst et al. |
| 6,339,369 B1 | 1/2002 | Paranjpe |
| 6,339,745 B1 | 1/2002 | Novik |
| 6,363,320 B1 | 3/2002 | Chou |
| 6,385,539 B1 | 5/2002 | Wilson et al. |
| 6,388,580 B1 | 5/2002 | Graham |
| 6,393,582 B1 | 5/2002 | Klecka et al. |
| 6,393,584 B1 | 5/2002 | McLaren et al. |
| 6,415,227 B1 | 7/2002 | Lin |
| 6,483,434 B1 | 11/2002 | Umiker |
| 6,502,080 B1 | 12/2002 | Eichorst et al. |
| 6,510,381 B2 | 1/2003 | Grounds et al. |
| 6,512,465 B2 | 1/2003 | Flick |
| 6,577,921 B1 | 6/2003 | Carson |
| 6,584,403 B2 | 6/2003 | Bunn |
| 6,701,234 B1 | 3/2004 | Vogelsang |
| 6,704,810 B1 | 3/2004 | Krehbiel, Jr. et al. |
| 6,714,857 B2 | 3/2004 | Kapolka et al. |
| 6,717,527 B2 | 4/2004 | Simon |
| 6,720,920 B2 | 4/2004 | Breed et al. |
| 6,737,963 B2 | 5/2004 | Gutta et al. |
| 6,748,320 B2 | 6/2004 | Jones |
| 6,771,970 B1 | 8/2004 | Dan |
| 6,816,090 B2 | 11/2004 | Teckchandani et al. |
| 6,832,153 B2 | 12/2004 | Thayer et al. |
| 6,844,827 B2 | 1/2005 | Flick |
| 6,856,902 B1 | 2/2005 | Mitchem |
| 6,871,137 B2 | 3/2005 | Scaer et al. |
| 6,873,963 B1 | 3/2005 | Westbury et al. |
| 6,904,359 B2 | 6/2005 | Jones |
| 6,930,638 B2 | 8/2005 | Lloyd et al. |
| 6,931,309 B2 | 8/2005 | Phelan et al. |
| 6,985,087 B2 | 1/2006 | Soliman |
| 7,035,856 B1 | 4/2006 | Morimoto |
| 7,039,520 B2 | 5/2006 | Draeger et al. |
| 7,065,445 B2 | 6/2006 | Thayer et al. |
| 7,072,764 B2 | 7/2006 | Donath et al. |
| 7,091,835 B2 | 8/2006 | Boulay et al. |
| 7,096,392 B2 | 8/2006 | Sim-Tang |
| 7,099,934 B1 | 8/2006 | Ewing et al. |
| 7,154,390 B2 | 12/2006 | Giermanski et al. |
| 7,170,390 B2 | 1/2007 | Quinones et al. |
| 7,174,243 B1 | 2/2007 | Lightner et al. |
| 7,177,738 B2 | 2/2007 | Diaz |
| 7,212,134 B2 | 5/2007 | Taylor |
| 7,215,255 B2 | 5/2007 | Grush |
| 7,242,303 B2 | 7/2007 | Patel et al. |
| 7,253,731 B2 | 8/2007 | Joao |
| 7,266,378 B2 | 9/2007 | Norta et al. |
| 7,283,046 B2 | 10/2007 | Culpepper et al. |
| 7,289,019 B1 | 10/2007 | Kertes |
| 7,302,344 B2 | 11/2007 | Olney et al. |
| 7,308,611 B2 | 12/2007 | Booth |
| 7,327,238 B2 | 2/2008 | Bhogal et al. |
| 7,339,469 B2 | 3/2008 | Braun |
| 7,343,306 B1 | 3/2008 | Bates et al. |
| 7,346,439 B2 | 3/2008 | Bodin |
| 7,346,790 B1 | 3/2008 | Klein |
| 7,405,658 B2 | 7/2008 | Richards |
| 7,446,649 B2 | 11/2008 | Bhogal et al. |
| 7,455,225 B1 | 11/2008 | Hadfield et al. |

(56) References Cited

U.S. PATENT DOCUMENTS

| | | | |
|---|---|---|---|
| 7,467,325 B2 | 12/2008 | Eisen et al. | |
| 7,472,202 B2 | 12/2008 | Parupudi et al. | |
| 7,479,877 B2 | 1/2009 | Mortenson et al. | |
| 7,486,176 B2 | 2/2009 | Bhogal et al. | |
| 7,489,993 B2 | 2/2009 | Coffee et al. | |
| 7,527,288 B2 | 5/2009 | Breed | |
| 7,552,008 B2 | 6/2009 | Newstrom et al. | |
| 7,555,370 B2 | 6/2009 | Breed et al. | |
| 7,571,051 B1 | 8/2009 | Shulman | |
| 7,574,195 B2 | 8/2009 | Krasner et al. | |
| 7,580,782 B2 | 8/2009 | Breed et al. | |
| 7,593,999 B2 | 9/2009 | Nathanson | |
| 7,600,150 B2 | 10/2009 | Wu | |
| 7,617,037 B2 | 11/2009 | Desens et al. | |
| 7,650,210 B2 | 1/2010 | Breed | |
| 7,652,568 B2 | 1/2010 | Waugh et al. | |
| 7,657,354 B2 | 2/2010 | Breed et al. | |
| 7,668,931 B2 | 2/2010 | Parupudi et al. | |
| 7,672,756 B2 | 3/2010 | Breed | |
| 7,693,626 B2 | 4/2010 | Breed et al. | |
| 7,701,363 B1 | 4/2010 | Zlojutro | |
| 7,725,216 B2 | 5/2010 | Kim | |
| 7,746,228 B2 | 6/2010 | Sensenig et al. | |
| 7,751,944 B2 | 7/2010 | Parupudi et al. | |
| 7,755,541 B2 | 7/2010 | Wisherd et al. | |
| 7,769,499 B2 | 8/2010 | McQuade et al. | |
| 7,774,633 B1 | 8/2010 | Harrenstien et al. | |
| 7,817,033 B2 | 10/2010 | Motoyama | |
| 7,848,765 B2 * | 12/2010 | Phillips | G08B 21/0236 455/456.3 |
| 7,876,239 B2 | 1/2011 | Horstemeyer | |
| 7,893,818 B2 | 2/2011 | Smoyer et al. | |
| 7,899,591 B2 | 3/2011 | Shah et al. | |
| 7,899,621 B2 | 3/2011 | Breed et al. | |
| 7,916,026 B2 | 3/2011 | Johnson et al. | |
| 7,950,570 B2 | 5/2011 | Marchasin et al. | |
| 7,971,095 B2 | 6/2011 | Hess et al. | |
| 7,987,017 B2 | 7/2011 | Buzzoni et al. | |
| 8,009,034 B2 | 8/2011 | Dobson et al. | |
| 8,009,086 B2 | 8/2011 | Grossnickle et al. | |
| 8,095,304 B2 | 1/2012 | Blanton et al. | |
| 8,103,450 B2 | 1/2012 | Takaoka | |
| 8,103,741 B2 | 1/2012 | Frazier et al. | |
| 8,106,757 B2 | 1/2012 | Brinton et al. | |
| 8,111,154 B1 | 2/2012 | Puri et al. | |
| 8,126,601 B2 | 2/2012 | Kapp et al. | |
| 8,181,868 B2 | 5/2012 | Thomas et al. | |
| 8,185,767 B2 | 5/2012 | Ballou et al. | |
| 8,201,009 B2 | 6/2012 | Sun et al. | |
| 8,237,591 B2 | 8/2012 | Holcomb et al. | |
| 8,255,144 B2 | 8/2012 | Breed et al. | |
| 8,279,067 B2 | 10/2012 | Berger et al. | |
| 8,299,920 B2 | 10/2012 | Hamm et al. | |
| 8,306,687 B2 | 11/2012 | Chen | |
| 8,311,858 B2 | 11/2012 | Everett et al. | |
| 8,326,813 B2 | 12/2012 | Nizami et al. | |
| 8,330,626 B1 | 12/2012 | Adelson | |
| 8,330,817 B1 | 12/2012 | Foster | |
| 8,368,561 B2 | 2/2013 | Welch et al. | |
| 8,380,426 B2 | 2/2013 | Konijnendijk | |
| 8,398,405 B2 | 3/2013 | Kumar | |
| 8,407,139 B1 | 3/2013 | Palmer | |
| 8,452,771 B2 | 5/2013 | Kurciska et al. | |
| 8,462,021 B2 | 6/2013 | Welch et al. | |
| 8,467,324 B2 | 6/2013 | Yousefi et al. | |
| 8,489,907 B2 | 7/2013 | Wakrat et al. | |
| 8,502,661 B2 | 8/2013 | Mauro et al. | |
| 8,504,233 B1 | 8/2013 | Ferguson et al. | |
| 8,504,512 B2 | 8/2013 | Herzog et al. | |
| 8,510,200 B2 | 8/2013 | Pearlman et al. | |
| 8,527,135 B2 | 9/2013 | Lowrey et al. | |
| 8,565,963 B2 | 10/2013 | Burke, Jr. | |
| 8,587,430 B2 | 11/2013 | Ferguson et al. | |
| 8,612,137 B2 | 12/2013 | Harris et al. | |
| 8,626,152 B2 | 1/2014 | Farrell et al. | |
| 8,655,544 B2 | 2/2014 | Fletcher et al. | |
| 8,655,983 B1 | 2/2014 | Harris et al. | |
| 8,671,063 B2 | 3/2014 | Ehrman et al. | |
| 8,700,249 B1 | 4/2014 | Carrithers | |
| 8,718,536 B2 | 5/2014 | Hannon | |
| 8,725,326 B2 | 5/2014 | Kapp et al. | |
| 8,725,342 B2 | 5/2014 | Ferguson et al. | |
| 8,761,821 B2 * | 6/2014 | Tibbitts | H04W 48/04 455/297 |
| 8,762,009 B2 | 6/2014 | Ehrman et al. | |
| 8,766,797 B2 | 7/2014 | Hamm et al. | |
| 8,770,480 B2 | 7/2014 | Gulli | |
| 8,781,169 B2 | 7/2014 | Jackson et al. | |
| 8,781,958 B2 | 7/2014 | Michael | |
| 8,799,461 B2 | 8/2014 | Herz et al. | |
| 8,839,026 B2 | 9/2014 | Kopylovitz | |
| 8,933,802 B2 | 1/2015 | Baade | |
| 8,970,701 B2 | 3/2015 | Lao | |
| 9,049,564 B2 | 6/2015 | Muetzel et al. | |
| 9,548,050 B2 * | 1/2017 | Gruber | G06F 17/3087 |
| 9,746,985 B1 * | 8/2017 | Humayun | G06F 17/30672 |
| 2001/0006398 A1 | 7/2001 | Nakamura et al. | |
| 2001/0018628 A1 | 8/2001 | Jenkins et al. | |
| 2001/0018639 A1 | 8/2001 | Bunn | |
| 2001/0034577 A1 | 10/2001 | Grounds et al. | |
| 2001/0037298 A1 | 11/2001 | Ehrman et al. | |
| 2002/0000916 A1 | 1/2002 | Richards | |
| 2002/0014978 A1 | 2/2002 | Flick | |
| 2002/0059126 A1 | 5/2002 | Ricciardi | |
| 2002/0070891 A1 | 6/2002 | Huston et al. | |
| 2002/0082025 A1 | 6/2002 | Baese et al. | |
| 2002/0184062 A1 | 12/2002 | Diaz | |
| 2002/0186144 A1 | 12/2002 | Meunier | |
| 2002/0198632 A1 | 12/2002 | Breed et al. | |
| 2003/0009361 A1 | 1/2003 | Hancock et al. | |
| 2003/0013146 A1 | 1/2003 | Werb | |
| 2003/0018428 A1 | 1/2003 | Knockeart et al. | |
| 2003/0023614 A1 | 1/2003 | Newstrom et al. | |
| 2003/0055542 A1 | 3/2003 | Knockeart et al. | |
| 2003/0055553 A1 | 3/2003 | Knockeart et al. | |
| 2003/0083060 A1 | 5/2003 | Menendez | |
| 2003/0125855 A1 | 7/2003 | Breed et al. | |
| 2003/0151501 A1 | 8/2003 | Teckchandani et al. | |
| 2003/0151507 A1 | 8/2003 | Andre et al. | |
| 2003/0158638 A1 | 8/2003 | Yakes et al. | |
| 2003/0158639 A1 | 8/2003 | Nada | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2003/0174067 A1 | 9/2003 | Soliman | |
| 2003/0176959 A1 | 9/2003 | Breed | |
| 2003/0191567 A1 | 10/2003 | Gentilcore | |
| 2003/0191568 A1 | 10/2003 | Breed | |
| 2003/0204407 A1 | 10/2003 | Nabors et al. | |
| 2004/0006398 A1 | 1/2004 | Bickford | |
| 2004/0006413 A1 | 1/2004 | Kane et al. | |
| 2004/0049337 A1 | 3/2004 | Knockeart et al. | |
| 2004/0056797 A1 | 3/2004 | Knockeart et al. | |
| 2004/0093291 A1 | 5/2004 | Bodin | |
| 2004/0102895 A1 | 5/2004 | Thayer et al. | |
| 2004/0102896 A1 | 5/2004 | Thayer et al. | |
| 2004/0130440 A1 | 7/2004 | Boulay et al. | |
| 2004/0143378 A1 | 7/2004 | Vogelsang | |
| 2004/0162063 A1 | 8/2004 | Quinones et al. | |
| 2004/0199285 A1 | 10/2004 | Berichon et al. | |
| 2004/0199302 A1 | 10/2004 | Pillar et al. | |
| 2004/0204969 A1 | 10/2004 | Wu | |
| 2004/0225557 A1 | 11/2004 | Phelan et al. | |
| 2004/0246177 A1 | 12/2004 | Lloyd et al. | |
| 2005/0004748 A1 | 1/2005 | Pinto et al. | |
| 2005/0007450 A1 | 1/2005 | Hill et al. | |
| 2005/0021199 A1 | 1/2005 | Zimmerman et al. | |
| 2005/0021722 A1 | 1/2005 | Metzger | |
| 2005/0043879 A1 | 2/2005 | Desens et al. | |
| 2005/0060069 A1 | 3/2005 | Breed et al. | |
| 2005/0080565 A1 | 4/2005 | Olney et al. | |
| 2005/0114023 A1 | 5/2005 | Williamson et al. | |
| 2005/0131597 A1 | 6/2005 | Raz et al. | |

(56) References Cited

U.S. PATENT DOCUMENTS

| | | |
|---|---|---|
| 2005/0134504 A1 | 6/2005 | Harwood et al. |
| 2005/0149251 A1 | 7/2005 | Donath et al. |
| 2005/0171798 A1 | 8/2005 | Croft et al. |
| 2005/0216294 A1 | 9/2005 | Labow |
| 2005/0237166 A1 | 10/2005 | Chen |
| 2006/0041341 A1 | 2/2006 | Kane et al. |
| 2006/0041342 A1 | 2/2006 | Kane et al. |
| 2006/0052913 A1 | 3/2006 | Kane et al. |
| 2006/0053075 A1 | 3/2006 | Roth et al. |
| 2006/0055561 A1 | 3/2006 | Kamali et al. |
| 2006/0074558 A1 | 4/2006 | Williamson et al. |
| 2006/0087411 A1 | 4/2006 | Chang |
| 2006/0089786 A1 | 4/2006 | Soehren |
| 2006/0109106 A1 | 5/2006 | Braun |
| 2006/0129290 A1 | 6/2006 | Zimmerman et al. |
| 2006/0155427 A1 | 7/2006 | Yang |
| 2006/0155434 A1 | 7/2006 | Kane et al. |
| 2006/0187026 A1 | 8/2006 | Kochis |
| 2006/0253234 A1 | 11/2006 | Kane et al. |
| 2006/0270421 A1* | 11/2006 | Phillips .............. G08B 21/0236 455/457 |
| 2006/0273922 A1 | 12/2006 | Bhogal et al. |
| 2007/0005202 A1 | 1/2007 | Breed |
| 2007/0027726 A1 | 2/2007 | Warren et al. |
| 2007/0057781 A1 | 3/2007 | Breed |
| 2007/0061054 A1 | 3/2007 | Rowe et al. |
| 2007/0061076 A1 | 3/2007 | Shulman |
| 2007/0086624 A1 | 4/2007 | Breed et al. |
| 2007/0087756 A1 | 4/2007 | Hoffberg |
| 2007/0096565 A1 | 5/2007 | Breed et al. |
| 2007/0096899 A1 | 5/2007 | Johnson |
| 2007/0115101 A1 | 5/2007 | Creekbaum et al. |
| 2007/0135984 A1 | 6/2007 | Breed et al. |
| 2007/0139216 A1 | 6/2007 | Breed |
| 2007/0156317 A1 | 7/2007 | Breed |
| 2007/0159354 A1 | 7/2007 | Rosenberg |
| 2007/0162550 A1 | 7/2007 | Rosenberg |
| 2007/0167147 A1 | 7/2007 | Krasner et al. |
| 2007/0185625 A1 | 8/2007 | Pillar et al. |
| 2007/0200690 A1 | 8/2007 | Bhogal et al. |
| 2007/0239322 A1 | 10/2007 | McQuade et al. |
| 2007/0244614 A1 | 10/2007 | Nathanson |
| 2007/0285240 A1 | 12/2007 | Sensenig et al. |
| 2007/0290836 A1 | 12/2007 | Ainsworth et al. |
| 2007/0290923 A1 | 12/2007 | Norta et al. |
| 2008/0015748 A1 | 1/2008 | Nagy |
| 2008/0036187 A1 | 2/2008 | Breed |
| 2008/0040004 A1 | 2/2008 | Breed |
| 2008/0040005 A1 | 2/2008 | Breed |
| 2008/0040023 A1 | 2/2008 | Breed et al. |
| 2008/0040268 A1 | 2/2008 | Corn |
| 2008/0042875 A1 | 2/2008 | Harrington et al. |
| 2008/0046150 A1 | 2/2008 | Breed |
| 2008/0051957 A1 | 2/2008 | Breed et al. |
| 2008/0051995 A1 | 2/2008 | Lokshin et al. |
| 2008/0061953 A1 | 3/2008 | Bhogal et al. |
| 2008/0065291 A1 | 3/2008 | Breed |
| 2008/0077285 A1 | 3/2008 | Kumar et al. |
| 2008/0077326 A1 | 3/2008 | Funk et al. |
| 2008/0091350 A1 | 4/2008 | Smith et al. |
| 2008/0111546 A1 | 5/2008 | Takahashi et al. |
| 2008/0119993 A1 | 5/2008 | Breed |
| 2008/0147265 A1 | 6/2008 | Breed |
| 2008/0147280 A1 | 6/2008 | Breed |
| 2008/0157510 A1 | 7/2008 | Breed et al. |
| 2008/0162045 A1 | 7/2008 | Lee |
| 2008/0167821 A1 | 7/2008 | Breed |
| 2008/0176537 A1 | 7/2008 | Smoyer et al. |
| 2008/0183344 A1 | 7/2008 | Doyen et al. |
| 2008/0183376 A1 | 7/2008 | Knockeart et al. |
| 2008/0195261 A1 | 8/2008 | Breed |
| 2008/0195432 A1 | 8/2008 | Fell et al. |
| 2008/0215190 A1 | 9/2008 | Pillar et al. |
| 2008/0234933 A1 | 9/2008 | Chowdhary et al. |
| 2008/0235105 A1 | 9/2008 | Payne et al. |
| 2008/0252431 A1 | 10/2008 | Nigam |
| 2008/0262669 A1 | 10/2008 | Smid et al. |
| 2008/0278314 A1 | 11/2008 | Miller et al. |
| 2008/0294302 A1 | 11/2008 | Basir |
| 2008/0318547 A1 | 12/2008 | Ballou, Jr. et al. |
| 2009/0033494 A1 | 2/2009 | Malik |
| 2009/0079591 A1 | 3/2009 | Motoyama |
| 2009/0082918 A1 | 3/2009 | Hendrix, Jr. |
| 2009/0112394 A1 | 4/2009 | Lepejian et al. |
| 2009/0138497 A1 | 5/2009 | Zavoli et al. |
| 2009/0140887 A1 | 6/2009 | Breed et al. |
| 2009/0177378 A1 | 7/2009 | Kamalski et al. |
| 2009/0261975 A1 | 10/2009 | Ferguson et al. |
| 2009/0273489 A1 | 11/2009 | Lu |
| 2009/0326808 A1 | 12/2009 | Blanton et al. |
| 2010/0036793 A1 | 2/2010 | Willis et al. |
| 2010/0049669 A1 | 2/2010 | Mazzarolo |
| 2010/0057279 A1 | 3/2010 | Kyllingstad |
| 2010/0057305 A1 | 3/2010 | Breed |
| 2010/0071572 A1 | 3/2010 | Carroll et al. |
| 2010/0076878 A1 | 3/2010 | Burr et al. |
| 2010/0082195 A1 | 4/2010 | Lee et al. |
| 2010/0094482 A1 | 4/2010 | Schofield et al. |
| 2010/0094500 A1 | 4/2010 | Jin |
| 2010/0106356 A1* | 4/2010 | Trepagnier ............ G01S 17/023 701/25 |
| 2010/0117868 A1 | 5/2010 | Van Wiemeersch et al. |
| 2010/0127867 A1 | 5/2010 | Chien et al. |
| 2010/0152972 A1 | 6/2010 | Attard et al. |
| 2010/0169009 A1 | 7/2010 | Breed et al. |
| 2010/0174487 A1 | 7/2010 | Soehren |
| 2010/0191412 A1 | 7/2010 | Kim |
| 2010/0207754 A1 | 8/2010 | Shostak et al. |
| 2010/0250411 A1 | 9/2010 | Ogrodski |
| 2010/0265104 A1 | 10/2010 | Zlojutro |
| 2010/0274415 A1 | 10/2010 | Lam |
| 2010/0332080 A1 | 12/2010 | Bae |
| 2010/0332118 A1 | 12/2010 | Geelen et al. |
| 2010/0332363 A1 | 12/2010 | Duddle et al. |
| 2011/0016340 A1 | 1/2011 | Sun et al. |
| 2011/0040579 A1* | 2/2011 | Havens ................ G06Q 10/08 705/4 |
| 2011/0060496 A1 | 3/2011 | Nielsen et al. |
| 2011/0071750 A1 | 3/2011 | Giovino et al. |
| 2011/0078089 A1 | 3/2011 | Hamm et al. |
| 2011/0090075 A1 | 4/2011 | Armitage et al. |
| 2011/0090399 A1 | 4/2011 | Whitaker et al. |
| 2011/0106337 A1 | 5/2011 | Patel et al. |
| 2011/0137489 A1 | 6/2011 | Gilleland et al. |
| 2011/0140877 A1 | 6/2011 | Gilchrist et al. |
| 2011/0143669 A1 | 6/2011 | Farrell et al. |
| 2011/0153368 A1* | 6/2011 | Pierre ................ G06Q 10/067 705/4 |
| 2011/0166773 A1 | 7/2011 | Raz et al. |
| 2011/0181391 A1 | 7/2011 | Chu |
| 2011/0196580 A1 | 8/2011 | Xu et al. |
| 2011/0221573 A1 | 9/2011 | Huat |
| 2011/0257880 A1 | 10/2011 | Watanabe et al. |
| 2011/0270772 A1 | 11/2011 | Hall et al. |
| 2011/0275388 A1 | 11/2011 | Haney |
| 2011/0320111 A1 | 12/2011 | Sarma et al. |
| 2012/0029818 A1 | 2/2012 | Smith et al. |
| 2012/0041618 A1 | 2/2012 | Sun et al. |
| 2012/0065871 A1 | 3/2012 | Deshpande et al. |
| 2012/0075088 A1 | 3/2012 | Marentes Aguilar |
| 2012/0077475 A1 | 3/2012 | Holcomb et al. |
| 2012/0078497 A1 | 3/2012 | Burke, Jr. |
| 2012/0089328 A1 | 4/2012 | Ellanti et al. |
| 2012/0089686 A1 | 4/2012 | Meister |
| 2012/0106446 A1 | 5/2012 | Yousefi et al. |
| 2012/0106801 A1 | 5/2012 | Jackson |
| 2012/0123806 A1 | 5/2012 | Schumann, Jr. et al. |
| 2012/0166018 A1 | 6/2012 | Larschan et al. |
| 2012/0191329 A1 | 7/2012 | Roessle et al. |
| 2012/0197484 A1 | 8/2012 | Nath et al. |
| 2012/0218129 A1 | 8/2012 | Burns |
| 2012/0232945 A1 | 9/2012 | Tong |
| 2012/0249326 A1 | 10/2012 | Mostov |
| 2012/0252488 A1 | 10/2012 | Hartmann et al. |

(56) References Cited

U.S. PATENT DOCUMENTS

| | | |
|---|---|---|
| 2012/0253861 A1 | 10/2012 | Davidson et al. |
| 2012/0268260 A1 | 10/2012 | Miller et al. |
| 2012/0303237 A1 | 11/2012 | Kumar et al. |
| 2012/0323767 A1 | 12/2012 | Michael |
| 2012/0323771 A1 | 12/2012 | Michael |
| 2012/0323772 A1 | 12/2012 | Michael |
| 2013/0024060 A1* | 1/2013 | Sukkarie et al. ...... G01C 21/26 701/22 |
| 2013/0031318 A1 | 1/2013 | Chen et al. |
| 2013/0031345 A1 | 1/2013 | Kung |
| 2013/0035827 A1 | 2/2013 | Breed |
| 2013/0057397 A1 | 3/2013 | Cutler et al. |
| 2013/0059607 A1 | 3/2013 | Herz et al. |
| 2013/0061044 A1 | 3/2013 | Pinkus et al. |
| 2013/0066757 A1 | 3/2013 | Lovelace et al. |
| 2013/0069390 A1 | 3/2013 | Foster |
| 2013/0097458 A1 | 4/2013 | Sekino et al. |
| 2013/0100286 A1 | 4/2013 | Lao |
| 2013/0113637 A1 | 5/2013 | Sin et al. |
| 2013/0131928 A1 | 5/2013 | Bolton et al. |
| 2013/0138251 A1 | 5/2013 | Thogersen et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0159214 A1 | 6/2013 | Boling et al. |
| 2013/0166198 A1 | 6/2013 | Funk et al. |
| 2013/0179034 A1 | 7/2013 | Pryor |
| 2013/0185193 A1 | 7/2013 | Boling et al. |
| 2013/0185221 A1 | 7/2013 | Adams et al. |
| 2013/0218369 A1 | 8/2013 | Yoshihama et al. |
| 2013/0218461 A1 | 8/2013 | Naimark |
| 2013/0222133 A1 | 8/2013 | Schultz et al. |
| 2013/0249713 A1 | 9/2013 | Adelson |
| 2013/0250933 A1 | 9/2013 | Yousefi et al. |
| 2013/0253732 A1 | 9/2013 | Patel et al. |
| 2013/0253734 A1 | 9/2013 | Kaap et al. |
| 2013/0253754 A1 | 9/2013 | Ferguson et al. |
| 2013/0297199 A1 | 11/2013 | Kapp et al. |
| 2013/0302757 A1 | 11/2013 | Pearlman et al. |
| 2013/0311077 A1 | 11/2013 | Ichida |
| 2013/0332070 A1 | 12/2013 | Fleizach et al. |
| 2014/0012438 A1 | 1/2014 | Shoppa et al. |
| 2014/0012510 A1 | 1/2014 | Mensinger et al. |
| 2014/0012511 A1 | 1/2014 | Mensinger et al. |
| 2014/0012634 A1 | 1/2014 | Pearlman et al. |
| 2014/0025229 A1 | 1/2014 | Levien et al. |
| 2014/0025230 A1 | 1/2014 | Levien et al. |
| 2014/0025233 A1 | 1/2014 | Levien et al. |
| 2014/0025234 A1 | 1/2014 | Levien et al. |
| 2014/0025235 A1 | 1/2014 | Levien et al. |
| 2014/0025236 A1 | 1/2014 | Levien et al. |
| 2014/0025284 A1 | 1/2014 | Roberts |
| 2014/0036072 A1 | 2/2014 | Lyall et al. |
| 2014/0052366 A1 | 2/2014 | Rothschild |
| 2014/0052605 A1 | 2/2014 | Beerle et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0058805 A1 | 2/2014 | Paesler et al. |
| 2014/0067160 A1 | 3/2014 | Levien et al. |
| 2014/0067167 A1 | 3/2014 | Levien et al. |
| 2014/0074692 A1 | 3/2014 | Beerle et al. |
| 2014/0077285 A1 | 3/2014 | Noda et al. |
| 2014/0077326 A1 | 3/2014 | Koshino et al. |
| 2014/0091350 A1 | 4/2014 | Katsuno et al. |
| 2014/0095061 A1 | 4/2014 | Hyde |
| 2014/0111546 A1 | 4/2014 | Utagawa |
| 2014/0119993 A1 | 5/2014 | Rhodes |
| 2014/0125500 A1 | 5/2014 | Baade |
| 2014/0125501 A1 | 5/2014 | Baade |
| 2014/0129426 A1 | 5/2014 | Lamb et al. |
| 2014/0143169 A1 | 5/2014 | Lozito |
| 2014/0147280 A1 | 5/2014 | Kowatsch |
| 2014/0157510 A1 | 6/2014 | Mjelde |
| 2014/0167821 A1 | 6/2014 | Yang et al. |
| 2014/0180567 A1 | 6/2014 | Fetsch |
| 2014/0183376 A1 | 7/2014 | Perkins |
| 2014/0195261 A1 | 7/2014 | Rasquinha et al. |
| 2014/0201064 A1 | 7/2014 | Jackson et al. |
| 2014/0210503 A1 | 7/2014 | Tam |
| 2014/0215190 A1 | 7/2014 | Mylius et al. |
| 2014/0220966 A1 | 8/2014 | Muetzel et al. |
| 2014/0267688 A1 | 9/2014 | Aich et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0168173 A1 | 6/2015 | Lewis-Evans et al. |
| 2015/0260529 A1 | 9/2015 | Petersen |
| 2015/0332525 A1 | 11/2015 | Harris et al. |

FOREIGN PATENT DOCUMENTS

| | | |
|---|---|---|
| CA | 2709740 A1 | 7/2009 |
| CA | 2712576 A1 | 2/2011 |
| CA | 2828835 A1 | 4/2014 |
| CA | 2832185 A1 | 5/2014 |
| CN | 2921908 Y | 7/2007 |
| CN | 101192322 A | 6/2008 |
| CN | 101240734 A | 8/2008 |
| CN | 101734228 A | 6/2010 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A2 | 12/1983 |
| EP | 0393935 A2 | 10/1990 |
| EP | 0451482 A1 | 10/1991 |
| EP | 0519630 A2 | 12/1992 |
| EP | 0744727 A2 | 11/1996 |
| EP | 0581558 B1 | 4/1997 |
| EP | 0795760 A3 | 4/1999 |
| EP | 0806632 B1 | 4/1999 |
| EP | 0660083 B1 | 9/2000 |
| EP | 0795700 B1 | 11/2001 |
| EP | 1191500 A1 | 3/2002 |
| EP | 0767448 B1 | 12/2002 |
| EP | 0785132 B1 | 5/2003 |
| EP | 1324241 A1 | 7/2003 |
| EP | 1384635 A1 | 1/2004 |
| EP | 0763713 B1 | 5/2004 |
| EP | 1752949 A1 | 2/2007 |
| EP | 1777541 A1 | 4/2007 |
| EP | 1785744 A1 | 5/2007 |
| EP | 1791101 B1 | 2/2008 |
| EP | 1912191 A1 | 4/2008 |
| EP | 1944190 A1 | 7/2008 |
| EP | 1760655 A3 | 9/2008 |
| EP | 2000889 A2 | 12/2008 |
| EP | 1870788 B1 | 10/2009 |
| EP | 1894779 B1 | 11/2009 |
| EP | 1975563 A3 | 11/2009 |
| EP | 1975565 A3 | 11/2009 |
| EP | 1804223 B1 | 12/2009 |
| EP | 1927961 B1 | 1/2010 |
| EP | 2154026 A1 | 2/2010 |
| EP | 2339562 A1 | 6/2011 |
| EP | 2418461 A1 | 2/2012 |
| EP | 2528043 A1 | 11/2012 |
| EP | 1975566 A3 | 12/2012 |
| EP | 1742083 B1 | 1/2013 |
| EP | 1895273 A3 | 1/2013 |
| EP | 2747004 A1 | 6/2014 |
| JP | 2006123891 A | 5/2006 |
| JP | 2014170000 A | 9/2014 |
| WO | 1984001823 A1 | 5/1984 |
| WO | 1998034314 A1 | 8/1998 |
| WO | 1999063357 A1 | 12/1999 |
| WO | 2000070530 A1 | 11/2000 |
| WO | 2001024393 A1 | 4/2001 |
| WO | 2001059601 A1 | 8/2001 |
| WO | 2001075472 A2 | 10/2001 |

(56) References Cited

FOREIGN PATENT DOCUMENTS

| | | |
|---|---|---|
| WO | 2002019683 A1 | 3/2002 |
| WO | 2002089077 A1 | 11/2002 |
| WO | 2003012473 A1 | 2/2003 |
| WO | 2003034089 A2 | 4/2003 |
| WO | 2003036462 A1 | 5/2003 |
| WO | 2003079717 A2 | 9/2003 |
| WO | 2004009473 A1 | 1/2004 |
| WO | 2004051594 A2 | 6/2004 |
| WO | 2004075090 A1 | 9/2004 |
| WO | 2004086076 A2 | 10/2004 |
| WO | 2004102536 A2 | 11/2004 |
| WO | 2005008603 A1 | 1/2005 |
| WO | 2006053566 A1 | 5/2006 |
| WO | 2008034097 A2 | 3/2008 |
| WO | 2008118578 A2 | 10/2008 |
| WO | 2008141456 A1 | 11/2008 |
| WO | 2009058972 A2 | 5/2009 |
| WO | 2009080070 A1 | 7/2009 |
| WO | 2009097595 A1 | 8/2009 |
| WO | 2009112305 A1 | 9/2009 |
| WO | 2009158469 A1 | 12/2009 |
| WO | 2011011544 A1 | 1/2011 |
| WO | 2011037766 A2 | 3/2011 |
| WO | 2011037800 A2 | 3/2011 |
| WO | 2011070534 A2 | 6/2011 |
| WO | 2013016581 A1 | 1/2013 |
| WO | 2014008752 A1 | 1/2014 |
| WO | 2014062668 A1 | 4/2014 |

OTHER PUBLICATIONS

"Dynamic Vehicle Detection Via the Use of Magnetic Field Sensors", MDPI, Jan. 19, 2016 by Vytautas Markevicius et al. (pp. 9) http://www.mdpi.com/1424-8220/16/1/78/pdf.

"Accuracy and Resource Consumption in Tracking and Location Prediction", 8th International Symposium, Jul. 2003 by Ouri Wolfson et al. (pp. 4) http://link.springer.com/chapter/10.1007/978-3-540-45072-6_19.

"A Heuristic Moving Vehicle Location Prediction Technique Via Optimal Paths Selection With Aid of Genetic Algorithm and Feed Forward Back Propagation Neural Network", Journal of Computer Science, Dec. 12, 2012 by Baby Anitha, E. et al. (pp. 9) http://citeseerx.ist.psu.edu/viewdoc/download?doi=10.1.1.687.3596&rep=rep1&type=pdf.

"Location Estimation and Trajectory Prediction of Moving Lateral Vehicle Using Two Wheel Shapes Information in 2-D Lateral Vehicle Images by 3-D Computer Vision Techniques", IEEE Xplore, Sep. 14-19, 2003 by Chih-Chiun Lai et al. (p. 1) http://ieeexplore.ieee.org/xpl/articleDetails.jsp?arnumber=1241704.

"Adaptive Location Prediction Strategies Based on a Hierarchical Network Model in a Cellular Mobile Environment", The Computer Journal, May, 1999 by Sajal K. Das et al. (p. 1) https://goo.gl/C27yaT.

"Automatic Transit Tracking, Mapping, and Arrival Time Prediction Using Smartphones", ACM Digital Library, Nov. 1-4, 2011 by James Biagioni et al. (pp. 14) https://www.cs.uic.edu/~jakob/papers/easytracker-sensys11.pdf.

"Location Prediction and Queries for Tracking Moving Objects", IEEE Xplore, 2000 by O. Wolfson et al. (p. 1) http://ieeexplore.ieee.org/xpl/articleDetails.jsp?arnumber=839495.

"A Novel Vehicular Location Prediction Based on Mobility Patterns for Routing in Urban VANET", EURASIP Journal on Wireless Communications and Networking, Dec. 2012 by Guangtao Xue et al. (pp. 28) http://link.springer.com/article/10.1186/1687-1499-2012-222.

"Vision-Based Vehicle Detection System With Consideration of the Detecting Location", IEEE Xplore, Apr. 3, 2012 by Minkyu Cheon et al. (p. 1) http://ieeexplore.ieee.org/xpl/articleDetails.jsp?arnumber=6175131.

"A Vehicle Detection Approach Based on Multi-Features Fusion in the Fisheye Images", IEEE Xplore, Mar. 11-13, 2011 by Guangtao Cheng et al. (p. 1) http://ieeexplore.ieee.org/xpl/articleDetails.jsp?arnumber=5763840.

"Save Money on Fleet Fueling Purchases", Sokolis Group Fuel Managment, Jan. 26, 2011 by Sokolis (p. 1) http://www.sokolisgroup.com/blog/save-money-on-fleet-fueling-purchases/.

"Sensor-based Logistics: Monitoring Shipment Vital Signs in Real Time", Inbound Logistics, Jun. 2013 by Chris Swearingen (pp. 2) http://www.inboundlogistics.com/cms/article/sensor-based-logistics-monitoring-shipment-vital-signs-in-real-time/.

"Electronic Cargo Tracking System and Solution, Intermodal Real-time Container Tracking and Rail Car Transport Security Tracking System for End-to-End Supply Chain Security System and Tracking Solution", Cargo Tracking & intermodal Transport Monitoring, Avante International Technology, Inc. in 2001-2015 (pp. 11) http://www.avantetech.com/products/shipping/.

"Sea Container Tracking Methods", Moving-Australia, 2012 (pp. 3) http://www.moving-australia.co.uk/container/tracking-methods.php.

"GlobalTag for Global Visibility and Tracking", Global Tracking Technology, in 2015 (pp. 5) http://globaltrackingtechnology.com/globaltag-for-global-visibility.html.

"The Course of the 'Connected' Car", It Is Innovation, Emphasis on safety, Jan. 6, 2013 by Murray Slovick (pp. 4) http://www.ce.org/i3/Features/2013/January-February/The-Course-of-the-Connected-car.aspx.

"Cooperating Embedded Systems and Wireless Sensor Networks", John Wiley & Sons, Inc., ISBN: 978-1-84821-000-4, Mar. 10, 2008 by Michel Banâtre et al. (pp. 2) http://as.wiley.com/WileyCDA/WileyTitle/productCd-1848210000.html.

"Mitsubishi Motors Develops New Driver Support System", Mitsubishi Motors, Dec. 15, 1998 (pp. 5) http://www.mitsubishi-motors.com/en/corporate/pressrelease/corporate/detail429.html.

"Vehicle Tracking for an Evasive Manoeuvres Assistant Using Low-Cost Ultrasonic Sensors", EBSCO Host Connections, 2014, vol. 14 Issue 12, p. 22689, Dec. 2014 by Jiménez, Felipe et al. (p. 1) http://connection.ebscohost.com/c/articles/100145890/vehicle-tracking-evasive-manoeuvres-assistant-using-low-cost-ultrasonic-sensors.

"The End of Demographics: How Marketers Are Going Deeper With Personal Data", Mashable Journal, in Jul. 1, 2011 by Jamie Beckland (pp. 7) http://mashable.com/2011/06/30/psychographics-marketing/.

"Power cycling 101: Optimizing energy use in advanced sensor products", Analog Dialogue, vol. 44, Aug. 2010 by Mark Looney (pp. 7) http://www.analog.com/library/analogdialogue/archives/44-08/power_cycling.html.

\* cited by examiner

| NEWLY INSURED DRIVER 102 | PRIVATE VEHICLE 104 | SET OF PARAMETERS 108 | SET OF ENTITIES 110A-N | BEHAVIOR FUNCTION 138 | ADHERENCE FUNCTION 106 | CREDIT 302 |
|---|---|---|---|---|---|---|
| Lisa White | PV1 | Speed Limit – 65 mph 90 Mile Radius Signal When Turn On | Insurance Provider | Speed : 60 mph | Yes | +10 |
| Carol Smith | PV2 | Speed Limit – 75 mph No Driving After 10 pm | Parent | Driving After 10 pm | No | -10 |
| • | • | • | • | • | • | • |
| • | • | • | • | • | • | • |
| • | • | • | • | • | • | • |

TABLE VIEW 350

FIGURE 3

| SET OF ENTITIES 110A-N | SET OF PARAMETERS 108 || NEWLY INSURED DRIVER 102 | PRIVATE VEHICLE 104 | BEHAVIOR FUNCTION 138 ||| CREDIT 302 | PUNITIVE MEASURE 408 |
| --- | --- | --- | --- | --- | --- | --- | --- | --- | --- |
| | CURFEW RANGE 402 | WEIGHTAGE 404 | | | GEO-SPATIAL LOCATION 204 | MOVEMENT FUNCTION 208 | CONDITION 406 | | |
| ACME Insurance | N/A | N/A | Bob Jones | PV5 | $X_1, Y_1$ | < 60 mph | Good | +20 | N/a |
| Driving School | 6 am - 8 pm | +/-20 | Sarah Jones | PV8 | $X_2, Y_2$ | After 8 pm | Low Oil | --- | -20 |
| • | • | • | • | • | • | • | • | • | • |
| • | • | • | • | • | • | • | • | • | • |
| • | • | • | • | • | • | • | • | • | • |

TABLE VIEW 450

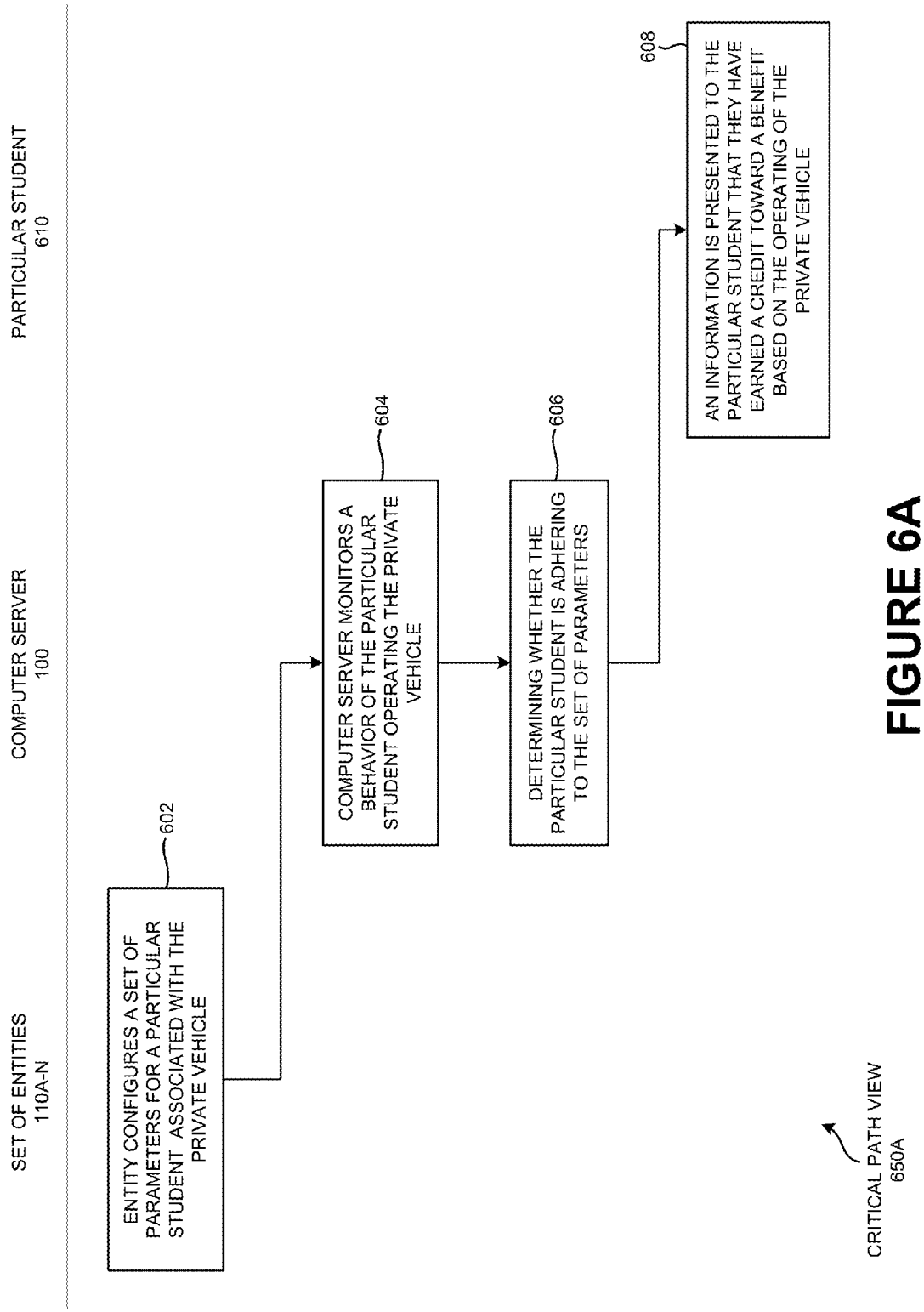

INSURANCE RATE OPTIMIZATION THROUGH DRIVER BEHAVIOR MONITORING

CLAIM OF PRIORITY

This non-provisional patent application is a Continuation-In-Part (CIP) application of, claims priority to, and incorporates by reference in its entirety United States (U.S.) non-provisional patent application Ser. No. 14/022,241 titled 'GEOSPATIAL DATA BASED ASSESSMENT OF FLEET DRIVER BEHAVIOR' filed on Sep. 10, 2013. The patent application Ser. No. 14/022,241 is a CIP of U.S. non-provisional patent application Ser. No. 13/941,471 filed on Jul. 13, 2013, which, in turn, claims priority to: U.S. non-provisional patent application Ser. No. 13/421,571 filed on Mar. 15, 2012, now issued as U.S. Pat. No. 8,510,200, U.S. non-provisional application Ser. No. 13/310,629 filed on Dec. 2, 2011, and U.S. non-provisional application Ser. No. 13/328,070 filed on Dec. 16, 2011.

FIELD OF THE TECHNOLOGY

This disclosure relates generally to the field of automotive technology, and more particularly, to a system, a method, and an apparatus of insurance rate optimization through driver behavior monitoring.

BACKGROUND

An insurance provider (e.g., an insurance company) may have a stake in the driving behaviors of the operators of private vehicles who are insured under its plans. For example, the insurance provider may determine insurance rates based on an analysis of collisions, traffic accidents, and/or tickets that the operators of private vehicles that are insured under its plans may receive. The insurance provider may rely on self-reporting from the operators themselves and/or government agencies (e.g., police departments, departments of motor vehicles, municipalities) to collect this information. However, the collected information may be misleading and/or incomplete. For example, the newly insured drivers (e.g., those that just passed a driving test and were recently insured) may not have a driving history on which to assess rates. Therefore, the insurance provider may not properly allocate insurance rates between operators having a common demographic profile but very different driving behaviors.

In addition, the insurance provider may wish to encourage desired behaviors of the operators of private vehicles. Punitive based methods of controlling the behavior of the operators of private vehicles may fail to facilitate adoption of desired behaviors. A lack of ability to properly monitor and/or incentivize the behavior of the operators of private vehicles may prevent insurance providers from improving and/or gaining useful knowledge of the behavior of operators of private vehicles. This may result in a lack of transparency in the insurance rate pricing system, and increased fees for the operators who otherwise deserve lower rates.

SUMMARY

Disclosed are a method, a device and/or a system of insurance rate optimization through driver behavior monitoring.

In one aspect, a system of a driver monitoring environment includes a computer server of the driver monitoring environment. The computer server includes one or more computers having instructions stored thereon that when executed cause the one or more computers to determine if a newly insured driver operating a private vehicle is adhering to a set of parameters set by an entity. An entity is a driving school, an insurance provider, and/or a family member of the newly insured driver. The system assigns a credit to the newly insured driver when the newly insured driver adheres to the set of parameters set by the entity using a processor and a memory. The newly insured driver is monitored by the entity. A metadata is generated which includes a behavioral trait of the newly insured driver. An insurance rate is set through the insurance provider based on an adherence to the set of parameters set by the entity.

The computer server may select an advertiser that targets the behavioral trait in promotion of a product and/or a service. The advertiser may be presented with an advertising opportunity to the newly insured driver operating the private vehicle through a mobile device of the newly insured driver. The entity may be permitted to configure a set of parameters. The entity may also permit to assign a weight to each of the set of parameters.

The system may provide a punitive measure when the set of parameters is violated. A curfew range may be set on the private vehicle such that a movement of the private vehicle is limited to the curfew range. The system may monitor a set of sensors of the private vehicle to determine a geospatial location and/or a condition of the private vehicle. The private vehicle may be associated with the newly insured driver. A behavior of the newly insured driver may be monitored when the newly insured driver is operating the private vehicle. The system may determine whether the newly insured driver is adhering to the set of parameters set by the entity. The system may present information to the newly insured driver that they have earned the credit toward a benefit based on the operating of the private vehicle.

In another aspect, a method creates a competition between students of a driving school. In addition, the method determines if a particular student operating a private vehicle is adhering to a set of parameters set by an entity. An entity is the driving school, an insurance provider, a parent of the particular student and/or a guardian of the particular student. A credit is assigned to the particular student when the particular student adheres to the set of parameters set by the entity using a processor and a memory. The particular student is monitored by the entity. A generated metadata includes a behavioral trait of the particular student. An advertiser is selected that targets the behavioral trait in promotion of a product and/or a service. The advertiser is presented with an advertising opportunity to the particular student operating the private vehicle through a mobile device of the particular student. An insurance policy is set through the insurance provider based on an adherence to the set of parameters set by the entity.

The private vehicle may be associated with the particular student. A behavior of the particular student may be monitored when the particular student is operating the private vehicle. The method may determine whether the particular student is adhering to the set of parameters set by the entity. Information may be presented to the particular student that they have earned the credit toward a benefit based on the operating of the private vehicle.

In yet another aspect, a method includes determining if a driver operating a private vehicle is adhering to a set of parameters set by an entity. An entity is a driving school, an insurance company, a family member of the driver, and/or an acquaintance of the driver. A credit is assigned to the driver when the driver adheres to the set of parameters set by the entity using a processor and a memory. The driver is monitored by the entity. A generated metadata includes a behavioral trait of the driver. An insurance policy is set through the insurance company based on an adherence to the set of parameters set by the entity.

The advertiser may be presented with an advertising opportunity to the driver operating the private vehicle through a mobile device of the driver. The private vehicle may be associated with the driver. A behavior of the driver may be monitored when the driver is operating the private vehicle. The method determines whether the driver is adhering to the set of parameters set by the entity. Information may be presented to the driver that they have earned the credit toward a benefit based on the operating of the private vehicle by the driver.

The methods and systems disclosed herein may be implemented in any means for achieving various aspects, and may be executed in a form of a machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which:

FIG. 3 is a table view of the newly insured driver of FIG. 1A and a set of parameters, according to at least one embodiment.

FIG. 6A is a critical path view to determine whether a particular student is adhering to the set of parameters of FIG. 1A, according to at least one embodiment.

Figure 1A:
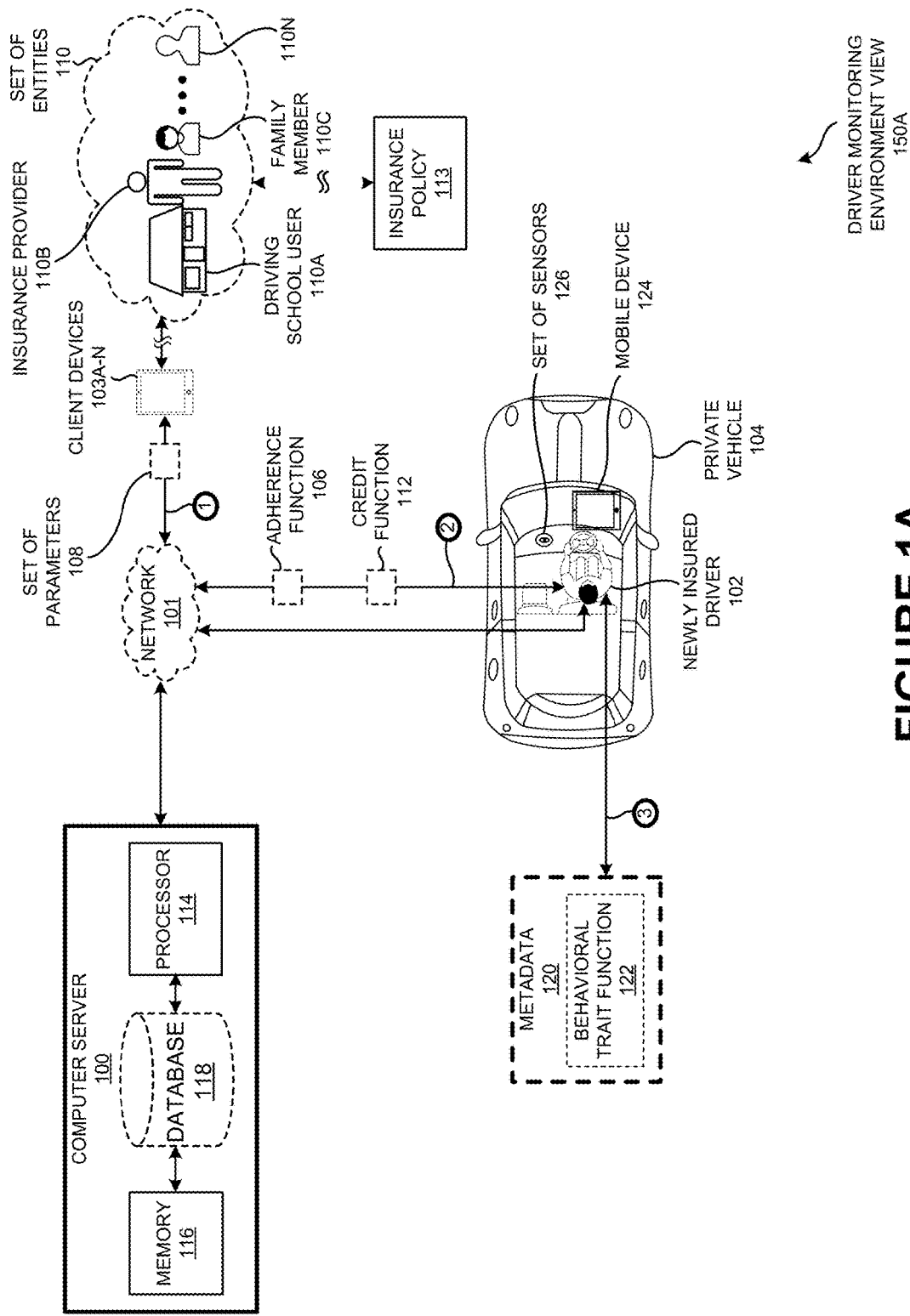
FIG. 1A is a network view of a computer server communicating a private vehicle through a network to optimize insurance rates through monitoring of a newly insured driver, according to at least one embodiment.

Other features of the present embodiments will be apparent from the accompanying drawings and from the detailed description that follows.

DETAILED DESCRIPTION

Disclosed are a method, a device and/or a system of insurance rate optimization through driver behavior monitoring.

In one embodiment, a system of a driver monitoring environment view 150A includes a computer server 100 of the driver monitoring environment view 150A. The computer server 100 includes one or more computers having instructions stored thereon that when executed cause the one or more computers to determine if a newly insured driver 102 operating a private vehicle 104 is adhering to a set of parameters 108 set by an entity (e.g., any one of the set of entities 110A-N). The entity (e.g., any one of the set of entities 110A-N) is a driving school user 110A, an insurance provider 110B, and/or a family member 110C of the newly insured driver 102.

The system assigns a credit (e.g., using the credit function 112 of the computer server 100) to the newly insured driver 102 when the newly insured driver 102 adheres to the set of parameters 108 set by the entity (e.g., any one of the set of entities 110A-N) using a processor 114 and a memory 116. The newly insured driver 102 is monitored by the entity (e.g., any one of the set of entities 110A-N). A metadata 120 is generated which includes a behavioral trait (e.g., using behavioral trait function 122 of the computer server 100) of the newly insured driver 102. An insurance rate is set through the insurance provider 110B based on an adherence (e.g., using adherence function 106 of the computer server 100) to the set of parameters 108 set by the entity (e.g., any one of the set of entities 110A-N).

The computer server 100 may select an advertiser 128 that targets the behavioral trait (e.g., using behavioral trait function 122 of the computer server 100) in promotion of a product (e.g., using a product function 130 of the computer server 100) and/or a service (e.g., using a service function 132 of the computer server 100). The advertiser 128 may be presented with an advertising opportunity (e.g., using advertising opportunity function 134 of the computer server 100) to the newly insured driver 102 operating the private vehicle 104 through a mobile device 124 (e.g., a smart phone, a tablet, a laptop) of the newly insured driver 102. The entity (e.g., any one of the set of entities 110A-N) may be permitted to configure the set of parameters 108. The entity (e.g., any one of the set of entities 110A-N) may also be permitted to assign a weight to each of the set of parameters 108, according to one embodiment.

The system may provide a punitive measure 408 (e.g., using punitive measure function 136 of the computer server 100) when the set of parameters 108 is violated. A curfew range (e.g., using curfew range function 200 of the computer server 100) may be set on the private vehicle 104 such that a movement (e.g., using movement function 208 of the computer server 100) of the private vehicle 104 is limited to the curfew range (e.g., using curfew range function 200 of the computer server 100). The system may monitor (e.g., using monitor function 202 of the computer server 100) a set of sensors 126 of the private vehicle 104 to determine a geospatial location 204 and/or a condition (e.g., using condition function 206 of the computer server 100) of the private vehicle 104. The private vehicle 104 may be associated with the newly insured driver 102, according to one embodiment.

A behavior (e.g., using behavior function 138 of the computer server 100) of the newly insured driver 102 may be monitored when the newly insured driver 102 is operating the private vehicle 104. The system may determine whether the newly insured driver 102 is adhering to the set of parameters 108 set by the entity (e.g., any one of the set of entities 110A-N). The system may present information to the newly insured driver 102 that they have earned the credit (e.g., using credit function 112 of the computer server 100) toward a benefit (e.g., using benefit function of the computer server 100) based on the operating of the private vehicle 104, according to one embodiment.

In another embodiment, a method creates a competition between students of a driving school user 110A. In addition, the method determines if a particular student 610 operating a private vehicle 104 is adhering to a set of parameters 108 set by an entity (e.g., any one of the set of entities 110A-N). The entity (e.g., any one of the set of entities 110A-N) is a driving school user 110A, an insurance provider 110B, a parent of the particular student 610 and/or a guardian of the particular student 610. A credit (e.g., using the credit function 112 of the computer server 100) is assigned to the particular student 610 when the particular student 610 adheres to the set of parameters 108 set by the entity (e.g., any one of the set of entities 110A-N) using a processor 114 and a memory 116. The particular student 610 is monitored by the entity (e.g., any one of the set of entities 110A-N).

A generated metadata 120 includes a behavioral trait (e.g., using a behavioral trait function 122 of the computer server 100) of the particular student 610. An advertiser 128 is selected that targets the behavioral trait (e.g., using a behavioral trait function 122 of the computer server 100) in promotion of a product (e.g., using a product function 130 of the computer server 100) and/or a service (e.g., using a service function 132 of the computer server 100). The advertiser 128 is presented with an advertising opportunity (e.g., using advertising opportunity function 134 of the computer server 100) to the particular student 610 operating the private vehicle 104 through a mobile device 124 (e.g., a smart phone, a tablet, a laptop) of the particular student 610. An insurance policy 113 is set through the insurance provider 110B based on an adherence (e.g., using adherence function 106 of the computer server 100) to the set of parameters 108 set by the entity (e.g., any one of the set of entities 110A-N).

The private vehicle 104 may be associated with the particular student 610. A behavior (e.g., using behavior function 138 of the computer server 100) of the particular student 610 may be monitored when the particular student 610 is operating the private vehicle 104. The method may determine whether the particular student 610 is adhering to the set of parameters 108 set by the entity (e.g., any one of the set of entities 110A-N). Information may be presented to the particular student 610 that they have earned the credit (e.g., using the credit function 112 of the computer server 100) toward a benefit (e.g., using benefit function of the computer server 100) based on the operating of the private vehicle 104.

In yet another embodiment, a method includes determining if a driver 600 operating a private vehicle 104 is adhering to a set of parameters 108 set by an entity (e.g., any one of the set of entities 110A-N). The entity (e.g., any one of the set of entities 110A-N) is a driving school user 110A, an insurance company, a family member 110C of the driver 600 and/or an acquaintance of the driver 600. A credit (e.g., using the credit function 112 of the computer server 100) is assigned to the driver 600 when the driver 600 adheres to the set of parameters 108 set by the entity (e.g., any one of the set of entities 110A-N) using a processor 114 and a memory 116. The driver 600 is monitored by the entity (e.g., any one of the set of entities 110A-N). A generated metadata 120 includes a behavioral trait (e.g., using a behavioral trait function 122 of the computer server 100) of the driver 600. An insurance policy 113 is set through the insurance company based on an adherence (e.g., using adherence function 106 using the computer server 100) to the set of parameters 108 set by the entity (e.g., any one of the set of entities 110A-N).

The advertiser 128 may be presented with an advertising opportunity (e.g., using advertising opportunity function 134 of the computer server 100) to the driver operating the private vehicle 104 through a mobile device 124 (e.g., a smart phone, a tablet, a laptop) of the driver. The private vehicle 104 may be associated with the driver 600. A behavior (e.g., using behavior function 138 of the computer server 100) of the driver 600 may be monitored when the driver 600 is operating the private vehicle 104. The method determines whether the driver 600 is adhering to the set of parameters 108 set by the entity (e.g., any one of the set of entities 110A-N). Information may be presented to the driver 600 that the driver 600 has earned the credit (e.g., using the credit function 112 of the computer server 100) toward a benefit (e.g., using benefit function of the computer server 100) based on the operating of the private vehicle 104 by the driver 600.

FIG. 1A is a network view of a computer server 100 communicating a private vehicle 104 through a network 101 to optimize insurance rates through monitoring of a newly insured driver 102, according to at least one embodiment. Particularly, FIG. 1A illustrates a network view of driver monitoring environment 150A, the computer server 100, the network 101, the newly insured driver 102, a private vehicle 104, an adherence function 106, a set of parameters 108, a set of entities 110 (e.g., including a driving school user 110A, an insurance provider 110B and/or a family member 110C), a credit function 112, an insurance policy 113, a processor 114, a memory 116, a database 118, a metadata 120, a behavioral trait function 122, a mobile device 124, and a set of sensors 126, according to one embodiment.

The computer server 100 may be a software (e.g., a program, an application) and/or a hardware, running on one or multiple computers, that manages resources and services of the network 101, while handling requests from different computers to access said resources, according to one embodiment. The network 101 may be a group of computing devices (e.g., hardware and software) that are linked together through communication channels to facilitate communication and resource-sharing among a wide range of entities 110A-N (e.g., including a driving school user 110A, an insurance provider 110B and/or a family member 110C), according to one embodiment.

A newly insured driver 102 may be a driver 600 that holds an insurance policy 113 (e.g., a contract between the insurance provider 110B and the driver 600, known as the policy holder, which determines the claims which the insurance provider 110B is legally required to pay), according to one embodiment. A private vehicle 104 may be a light vehicle (e.g., passenger car, minivan, pickup truck, van, light trucks, motor bike, and/or utility vehicles) used for personal use, according to one embodiment.

An adherence function 106 may be a set of instructions that performs a specific task of ensuring that the newly insured driver 102 follows a set of rules defined by any one of the set of entities 110A-N (e.g., including a driving school user 110A, an insurance provider 110B and/or a family member 110C), according to one embodiment. A set of parameters 108 may be safety measures, over speed limit, following traffic rules, driving within curfew range, etc. set and monitored by the set of entities 110A-N (e.g., including a driving school user 110A, an insurance provider 110B and/or a family member 110C), according to one embodiment.

A set of entities 110A-N (e.g., including a driving school user 110A, an insurance provider 110B and/or a family member 110C) may be authorized bodies to set and monitor the set of parameters 108 for the driver 600, according to one embodiment. The driving school user 110A may be a particular student 610, a newly insured driver 102 who will be driving the private vehicle 104 (e.g., passenger car, minivan, pickup truck, van, light trucks, motor bike, and/or utility vehicles), according to one embodiment. An insurance provider 110B may be an individual, an insurer, an insurance carrier, an insurance company who issues an insurance policy 113 and assumes the risks associated with the driver 600, according to one embodiment.

A family member 110C (e.g., a parent 900, a guardian) may be an entity which holds the responsibility and/or authority of the driver 600 driving the private vehicle 104 (e.g., passenger car, minivan, pickup truck, van, light trucks, motor bike, and/or utility vehicles), according to one embodiment. A credit function 112 may be providing recognition points to the driver 600 when the driver 600 follows the specific set of parameters 108 set by the set of entities 110A-N (e.g., including a driving school user 110A, an insurance provider 110B and/or a family member 110C), according to one embodiment. An insurance policy 113 may be a contract between the insurance provider 110B and the driver 600, known as the policy holder, which determines the claims which the insurance provider 110B is legally required to pay, according to one embodiment.

A processor 114 may be a central unit of the computer containing the logic circuitry to perform all the basic instructions of a computer program, according to one embodiment. A memory 116 may be a device used to store data or programs (sequences of instructions) on a temporary or permanent basis for use in an electronic digital computer, according to one embodiment. A database 118 may be a collection of information that is organized to be easily accessed, managed, and/or updated, according to one embodiment. A metadata 120 may provide the information about the behavioral trait function 122 of the driver 600 driving the private vehicle 104, according to one embodiment.

A behavioral trait function 122 may be an action commonly observed in the driving patterns of a driver 600 driving the private vehicle 104, according to one embodiment. A mobile device 124 may be a handheld device that is made for portability for data storage, processing, and/or display technologies and run various types of application software, according to one embodiment. A set of sensors 126 (e.g., GPS, CDMA, GSM, RFID, IMEI No. tracking) of the private vehicle 104 may be used to determine a geospatial location 204 and/or a condition (e.g., using condition function 206 of the computer server 100) of the private vehicle 104, according to one embodiment.

FIG. 1A illustrates a computer server 100 includes a database 118 coupled with a memory 116 and a processor 114, according to one embodiment. The computer server 100 is connected to the client device 103A-N through the network 101. The computer server 100 is communicatively coupled with the private vehicle 104 through the network 101. Each of the entities 110A-N may be associated with the client device 103A-N. A private vehicle 104 may be communicatively coupled with the computer server 100 through a set of sensors 126, in the embodiment of FIG. 1A. The set of sensors 126 is illustrated in the embodiment of FIG. 1A as being within the private vehicle 104. A newly insured driver 102 who possess a mobile device 124 is illustrated in the embodiment of FIG. 1A as driving the private vehicle 104.

A metadata 120 using a behavioral trait function 122 may be generated by the set of sensors 126. In circle '1', computer server 100 may determine if a newly insured driver 102 operating a private vehicle 104 is adhering to a set of parameters 108 configured by the set of entities 110A-N. In circle '2', the newly insured driver 102 may be assigned a credit when the newly insured driver 102 adheres to the set of parameters 108 configured by the set of entities 110A-N. In circle '3', a metadata 120 comprising a behavioral trait of the newly insured driver 102 may be generated.

Figure 1B:
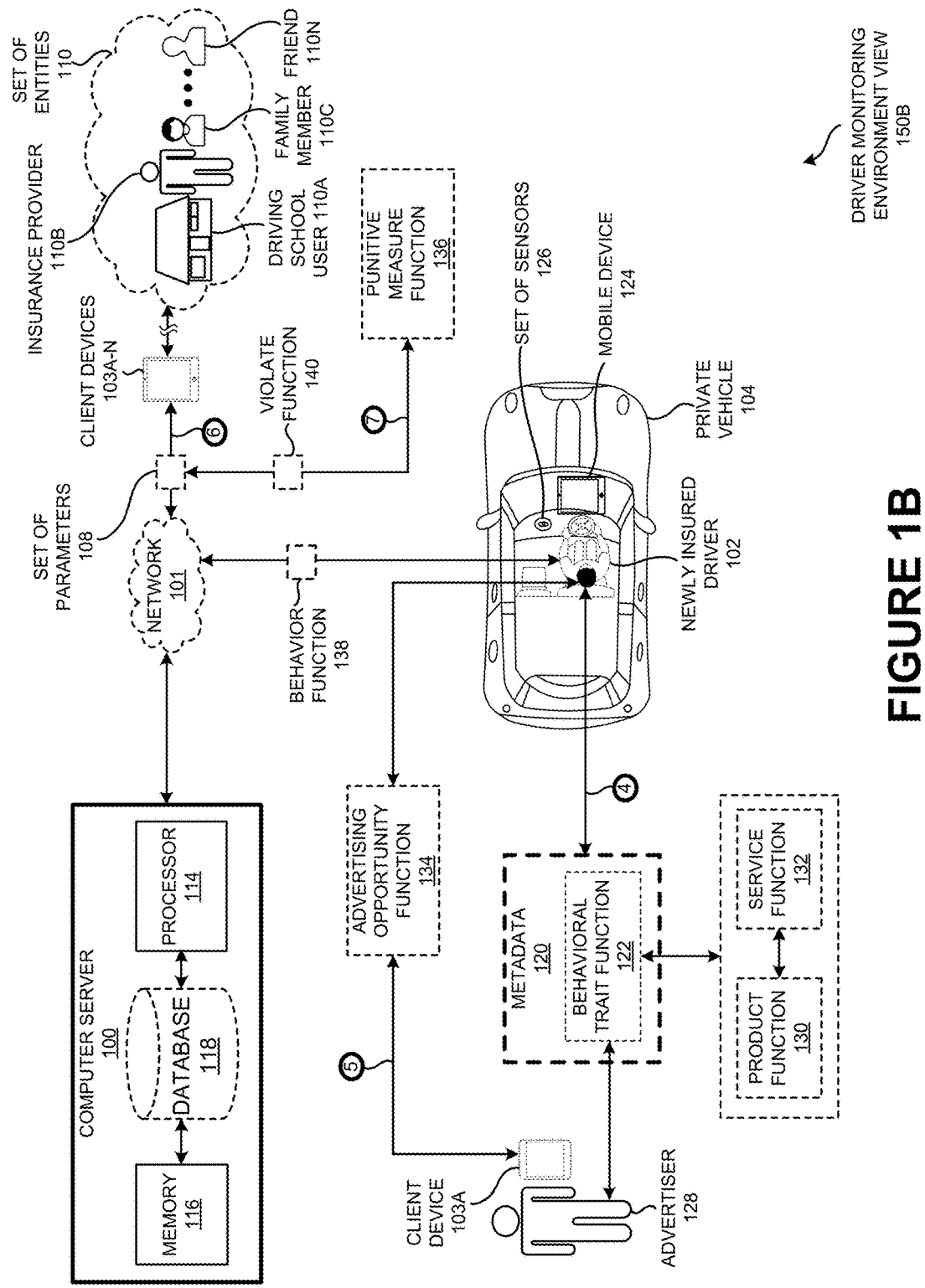
FIG. 1B is a network view of an advertiser being presented with an advertising opportunity to the newly insured driver monitored by the computer server of FIG. 1A, according to at least one embodiment.

FIG. 1B is a driver monitoring environment view 150B of an advertiser 128 being presented with an advertising opportunity (e.g., advertising opportunity function 134) to the newly insured driver 102 monitored by the computer server 100 of FIG. 1A, according to at least one embodiment. Particularly, FIG. 1B illustrates an advertiser 128, a product function 130, a service function 132, an advertising opportunity function 134, a punitive measure function 136, a behavior function 138, and a violate function 140, according to at least one embodiment. FIG. 1B differs from FIG. 1A as it may describe an advertiser 128 being presented with an advertising opportunity.

An advertiser 128 may be a person, an organization or a company which gives information to the public about a product or a service in some public medium of communication, according to one embodiment. A product function 130 may include a set of goods (e.g., goods, helmet, and driving gloves) that are offered to the newly insured driver 102 by the advertiser 128, according to one embodiment. A service function 132 may include a set of offerings (e.g., car wash, maintenance) that are offered to the newly insured driver 102 by the advertiser 128, according to one embodiment.

An advertising opportunity function 134 may be a set of instructions that helps an advertiser 128 to provide an advertisement based on the behavioral trait of the driver 600, according to one embodiment. A punitive measure function 136 may be a set of instructions that determines penalty given to the driver 600 not abiding the set of parameters 108 configured by the set of entities 110A-N (e.g., including a driving school user 110A, an insurance provider 110B and/or a family member 110C), according to one embodiment.

A behavior function 138 may be a set of instructions that monitors the driving actions of the driver 600, according to one embodiment. A violate function 140 may be a set of instructions that monitors the driver 600 who defies the set of parameters 108 configured by the set of entities 110A-N (e.g., including a driving school user 110A, an insurance provider 110B and/or a family member 110C), according to one embodiment.

FIG. 1B illustrates a computer server 100 communicatively coupled with an advertiser 128 associated with the client device 103A through the network 101, according to one embodiment. A product function 130 and a service function 132 is used by the behavioral trait function 122 to generate an advertising opportunity for the advertiser 128. In circle '4', an advertiser 128 may be selected which targets the behavioral trait in promotion of a product and/or a service. In circle '5', the advertiser 128 may be presented with an advertising opportunity to the newly insured driver 102 operating the private vehicle 104 through the mobile device 124 of the newly insured driver 102. In circle '6', the entity may be permitted to configure the set of parameters 108. In circle '7', a punitive measure 408 may be taken into consideration when the set of parameters 108 is violated.

Figure 2:
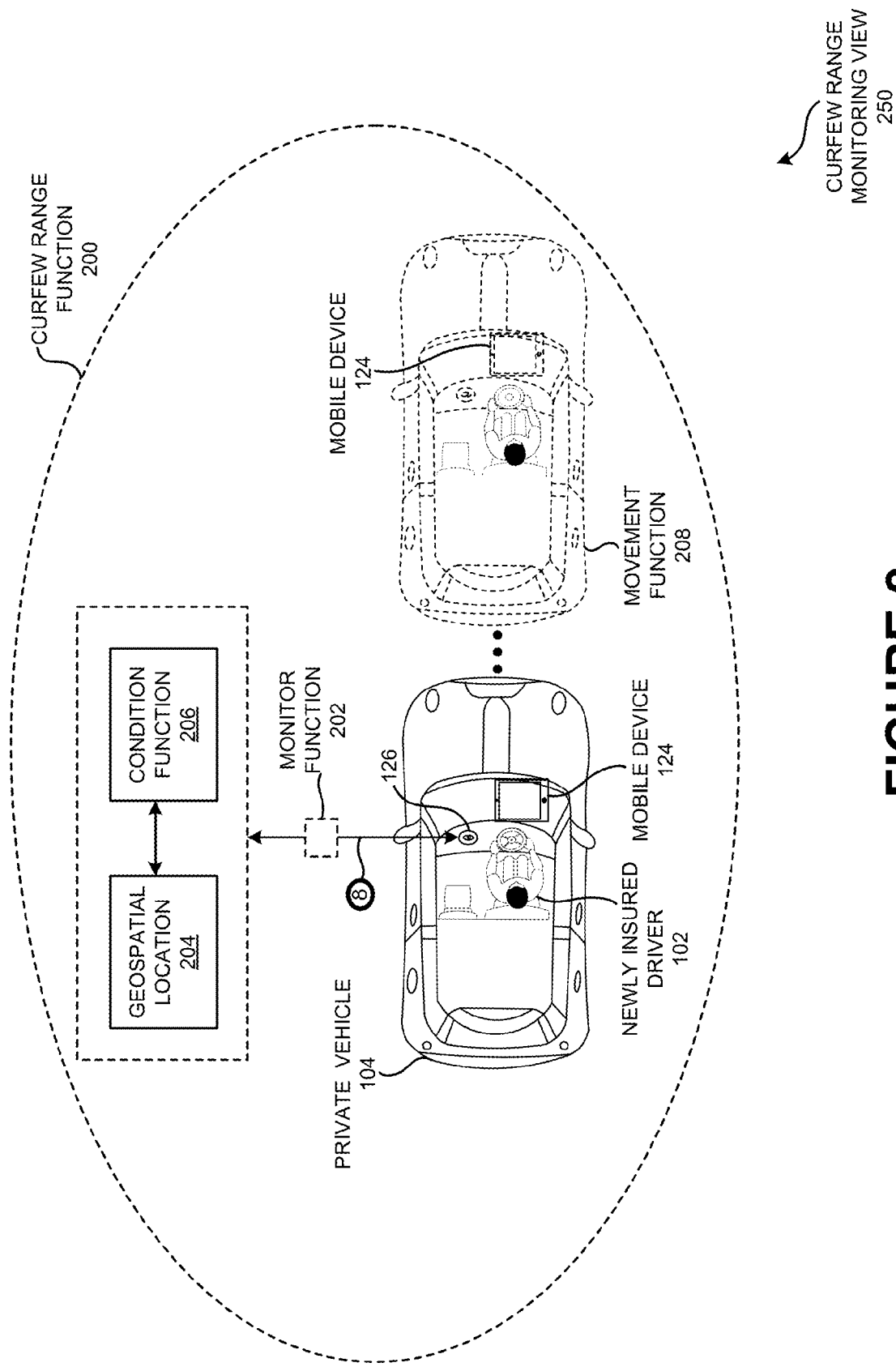
FIG. 2 is a driver monitoring environment view illustrating an application of a curfew range function to the private vehicle of FIG. 1A, according to at least one embodiment.

FIG. 2 is a curfew range monitoring view 250 illustrating an application of curfew range function 200 to the private vehicle 104 of FIG. 1A, according to at least one embodiment. Particularly, the FIG. 2 illustrates, curfew range function 200, a monitor function 202, geospatial location 204, a condition function 206, and a movement function 208, according to at least one embodiment.

A curfew range function 200 may be a set of instructions that ensures the movement of the private vehicle 104 is limited (e.g., to a geographical boundary, time of a day and/or a day of a week), according to one embodiment. A monitor function 202 may be set of instructions that monitor a set of sensors 126 to trace the exact location of the private vehicle 104 within the specified geographical boundary, according to one embodiment.

A geospatial location 204 may be a set of coordinates indicating the current location of the private vehicle 104 within the specified geographical boundary, according to one embodiment. A condition function 206 may include set of operating factors (e.g., fuel level, radiator temperature, battery level indicator, air pressure indicator) to determine the present condition of the private vehicle 104, according to one embodiment. A movement function 208 may include a set of instructions that monitors the motion of the private vehicle 104 from one geospatial location 204 to another geospatial location 204 within the given curfew range, according to one embodiment.

FIG. 2 illustrates the movement of the private vehicle 104 within a curfew range, according to one embodiment. In circle '8' a geospatial location 204 and a condition of the private vehicle 104 may be monitored using a set of sensors 126 of the private vehicle 104, according to one embodiment.

FIG. 3 is a table view 350 of the newly insured driver 102 of FIG. 1A and set of parameters 108, according to at least one embodiment. A number of fields are illustrated in the table view 350 including fields associated with the newly insured driver 102, the private vehicle 104, the set of parameters 108, the set of entities 110A-N, the behavior function 138, the adherence function 106 and the credit function 112.

Particularly, FIG. 3 illustrates an example of two records—Lisa White and Carol Smith. The record of Lisa White driving the private vehicle 104 PV1, having the set of parameters 108 i.e. speed limit—65 mph, radius—90 miles, when the signal turns ON, having insurance provider as an entity. The behavior function 138 may be applied to determine the average speed of 60 mph. A credit function 112 may be applied to credit 10 points to Lisa White when adhering to the set of parameters 108 set by the entity, according to one embodiment.

The record of Carol Smith driving the private vehicle 104 PV2, having the set of parameters 108 i.e. speed limit—75 mph, driving allowed till 10 pm having a parent 900 as an entity. The behavior function 138 may be applied to determine driving time. A credit function may be applied to penalize 10 points to Carol Smith when found violating the set of parameters 108 set by the entity, according to one embodiment.

Figure 4:
FIG. 4 is a table view of a set of parameters and a behavior function of the newly insured driver of FIG. 1A, according to at least one embodiment.

FIG. 4 is a table view 450 of set of parameters 108 and behavior function 138 of the newly insured driver 102 of FIG. 1A, according to at least one embodiment. Particularly, FIG. 4 is a table view 450 showing the number fields associated with the set of entities 110A-N, set of parameters 108 including curfew range 402 with the corresponding weightage 404, the newly insured driver 102, the private vehicle 104, the behavior function 138 including geospatial location 204, movement function 208, the condition 406, the credit 302, and punitive measure 408, according to one embodiment.

Particularly, FIG. 4 illustrates an example of two records—ACME Insurance and driving school. The record of Bob Jones having entity ACME Insurance driving private vehicle PV5 with no curfew range restriction. The behavior function 138 shows the geospatial location 204 having coordinates as $(X_1, Y_1)$, restricting the movement of the private vehicle 104 to 60 mph, maintaining a good vehicle condition. Bob Jones may be credited with 20 points for adhering to the set of parameters 108.

The record of Sarah Jones having entity as a driving school 1100 driving a private vehicle PV8 with a curfew range 402 restriction of 6 am to 8 pm and the corresponding weightage. The behavior function 138 shows the geospatial location 204 having coordinates as $(X_2, Y_2)$, restricting the movement of the private vehicle 104 till 8 pm with low oil level detected in the vehicle. Sarah Jones may be penalized with 20 points for not adhering to the set of parameters 108.

Figure 5:
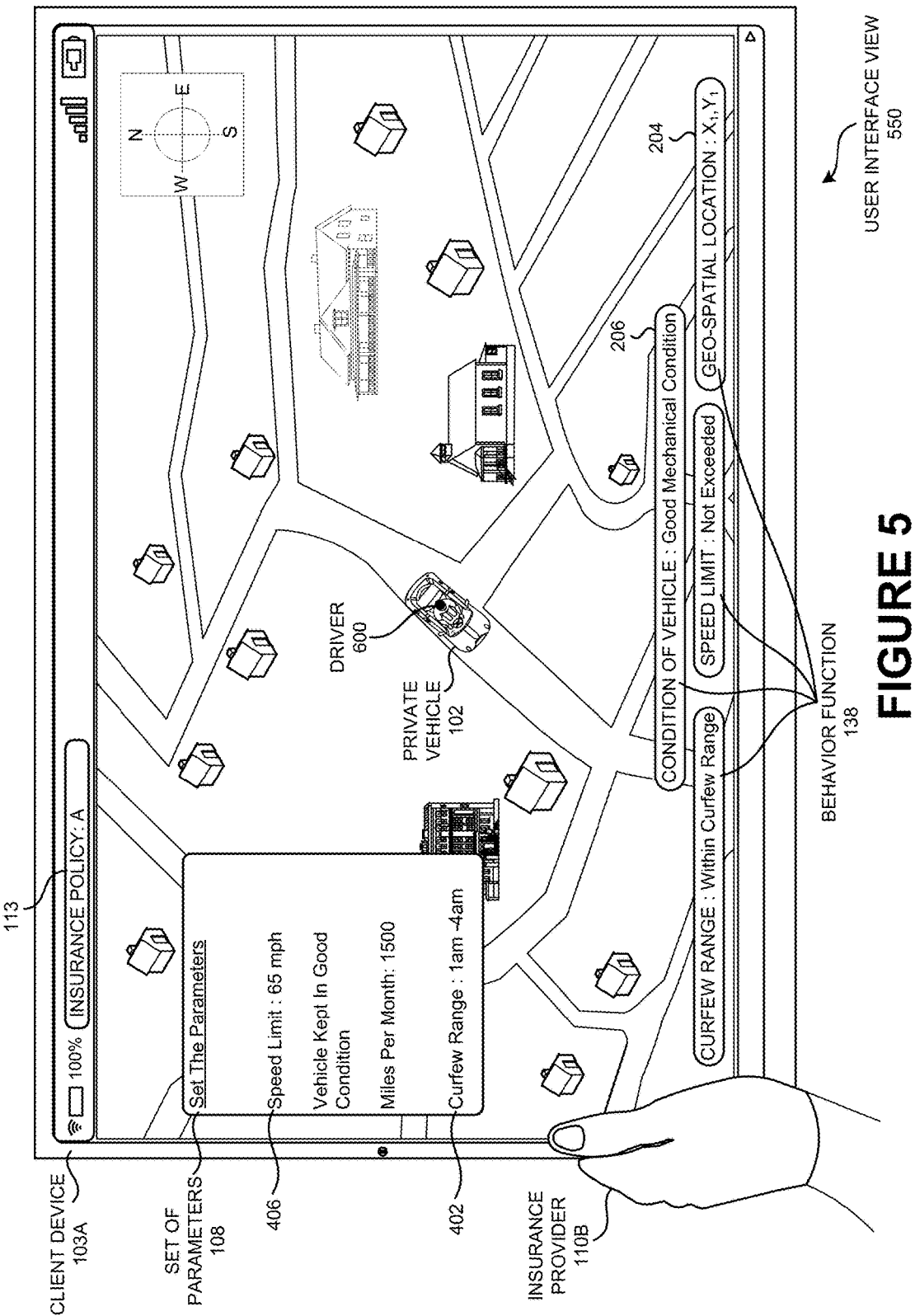
FIG. 5 is a graphical view of an insurance provider configuring the set of parameters of the newly insured driver of FIG. 1A, according to at least one embodiment.

FIG. 5 is a user interface view 550 of an insurance provider 110B with a client device 103A configuring the set of parameters 108 for monitoring the behavior of the driver 600 driving the private vehicle 104, according to at least one embodiment. Particularly, FIG. 5 illustrates the set of parameters 108 configured by the insurance provider 110B for the driver 600 are speed limit—65 mph, the vehicle should be maintained in a good driving condition, must not exceed the distance limit of 1500 miles per month and is restricted to drive from 1 am to 4 am within the curfew range 402, according to one embodiment. The behavior data of the driver 600 shows good mechanical condition, driving within curfew range 402, not exceeding speed limit and geospatial location 204 having coordinates $(X_1, Y_1)$, according to at least one embodiment.

FIG. 6A is a critical path view 650A of determining whether the particular student 610 is adhering to the set of parameters 108, according to at least one embodiment. In operation 602, the set of entities 110A-N may configure a set of parameters 108 for a particular student 610 associated with the private vehicle 104. In operation 604, the computer server 100 may monitor a behavior of the particular student 610 operating the private vehicle 104. In operation 606, the computer server 100 may determine whether the particular student 610 is adhering to the set of parameters 108. In operation 608, information may be presented to the particular student 610 about the earned credit toward a benefit based on the operating of the private vehicle 104.

Figure 6B:
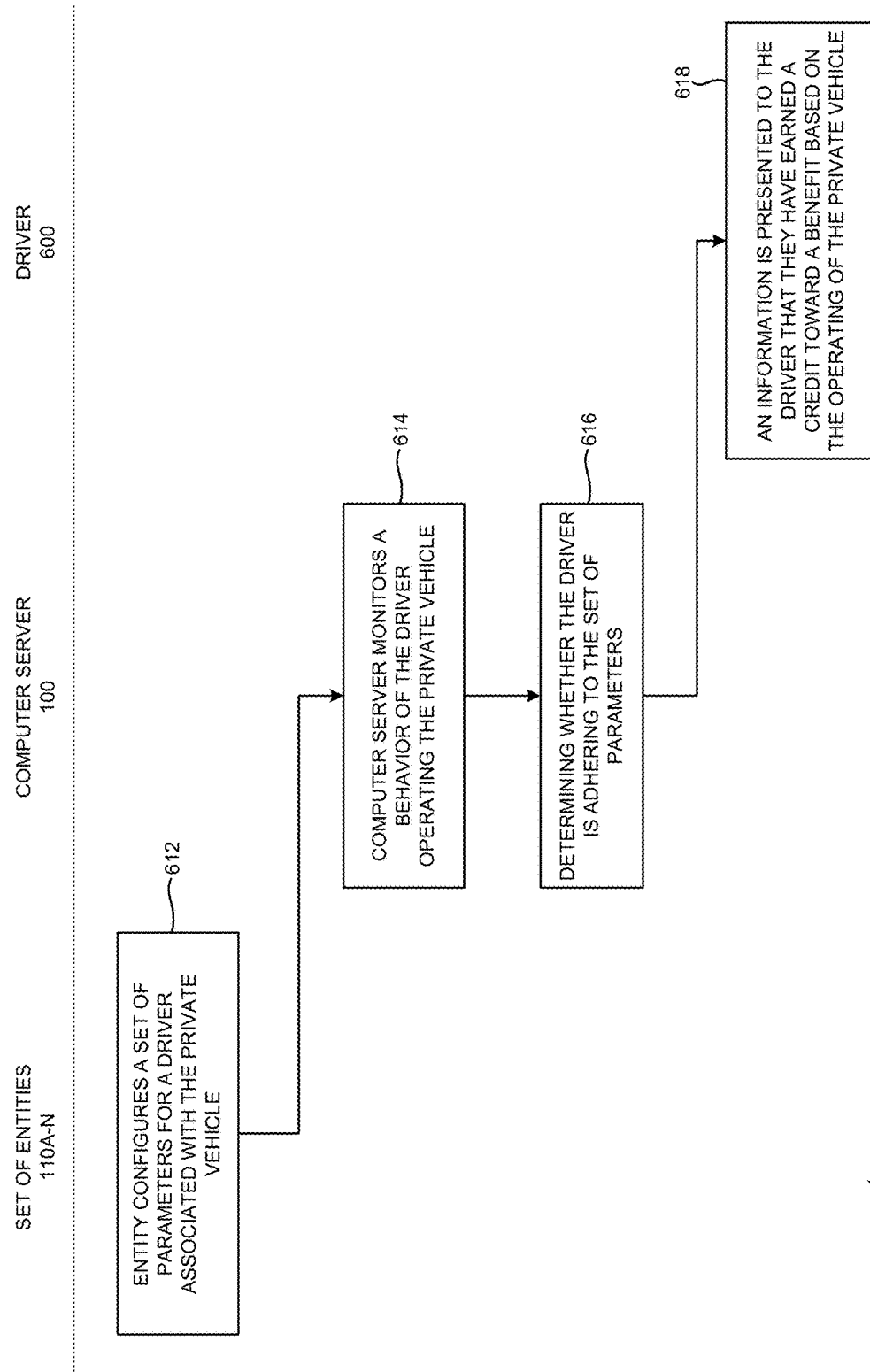
FIG. 6B is a critical path view to determine whether a driver is adhering to the set of parameters of FIG. 1A, according to at least one embodiment.

FIG. 6B is a critical path view 650B of determining whether the driver 600 is adhering to the set of parameters 108, according to at least one embodiment. In operation 612, the set of entities 110A-N may configure a set of parameters 108 for a driver 600 associated with the private vehicle 104, according to one embodiment. In operation 614, the computer server 100 can monitor a behavior of the driver 600 operating the private vehicle 104. In operation 616, the computer server 100 may determine whether the driver 600 is adhering to the set of parameters 108. In operation 618, information may be presented to the driver 600 about the earned credit toward a benefit based on the operating of the private vehicle 104.

Figure 7:
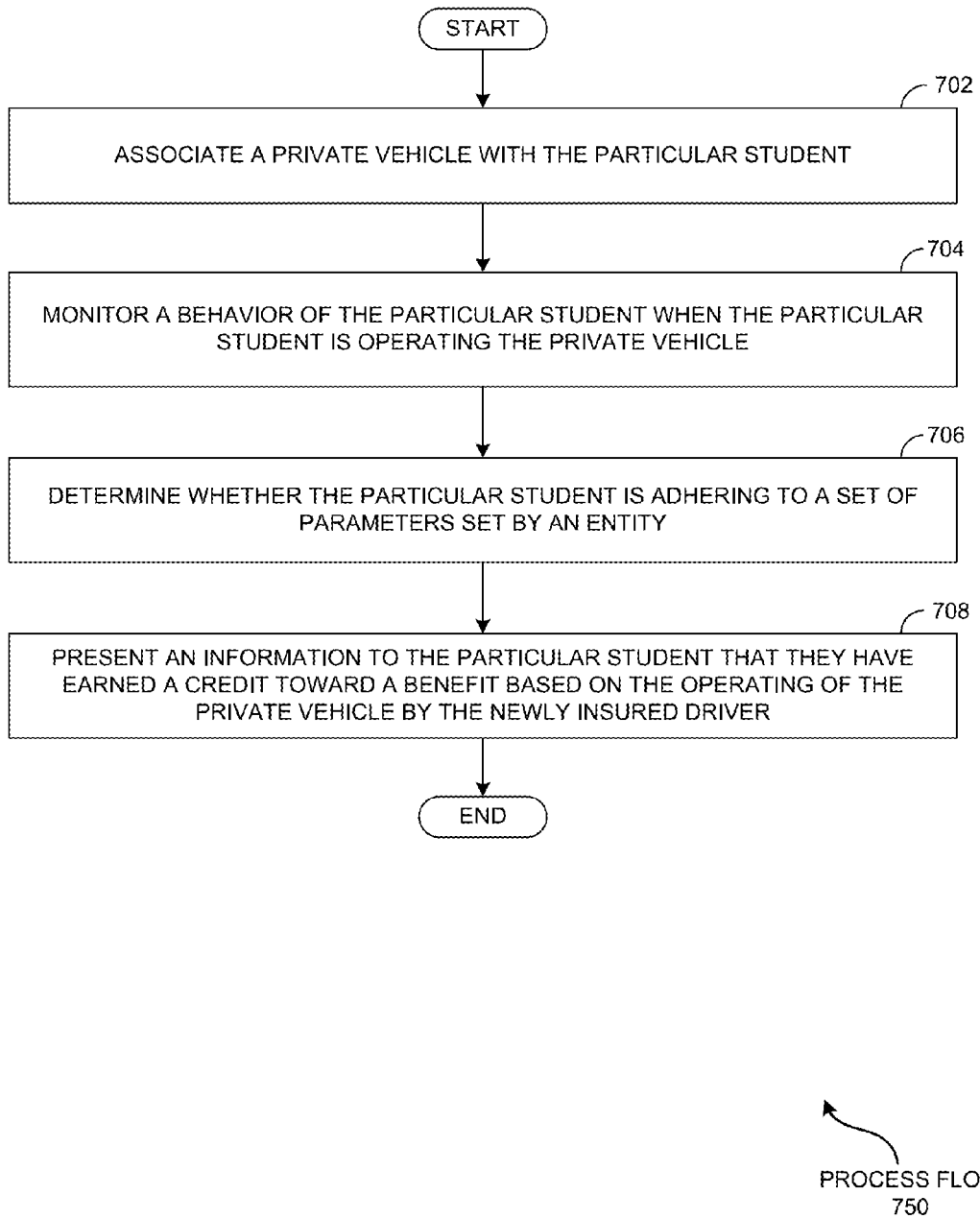
FIG. 7 is a process flow to determine whether the particular student is adhering to the set of parameters of FIG. 1A, according to at least one embodiment.

FIG. 7 is a process flow 750 of determining whether the particular student 610 is adhering to the set of parameters 108, according to at least one embodiment. In operation 702, the private vehicle 104 may be associated with the particular student 610. In operation 704, the behavior of the particular student 610 may be monitored when the particular student 610 is operating the private vehicle 104. In operation 706, an entity may determine whether the particular student 610 is adhering to a set of parameters 108. In operation 708, the particular student 610 may be presented with information that they have earned a credit toward a benefit based on the operating of the private vehicle 104 by the newly insured driver 102.

Figure 8:
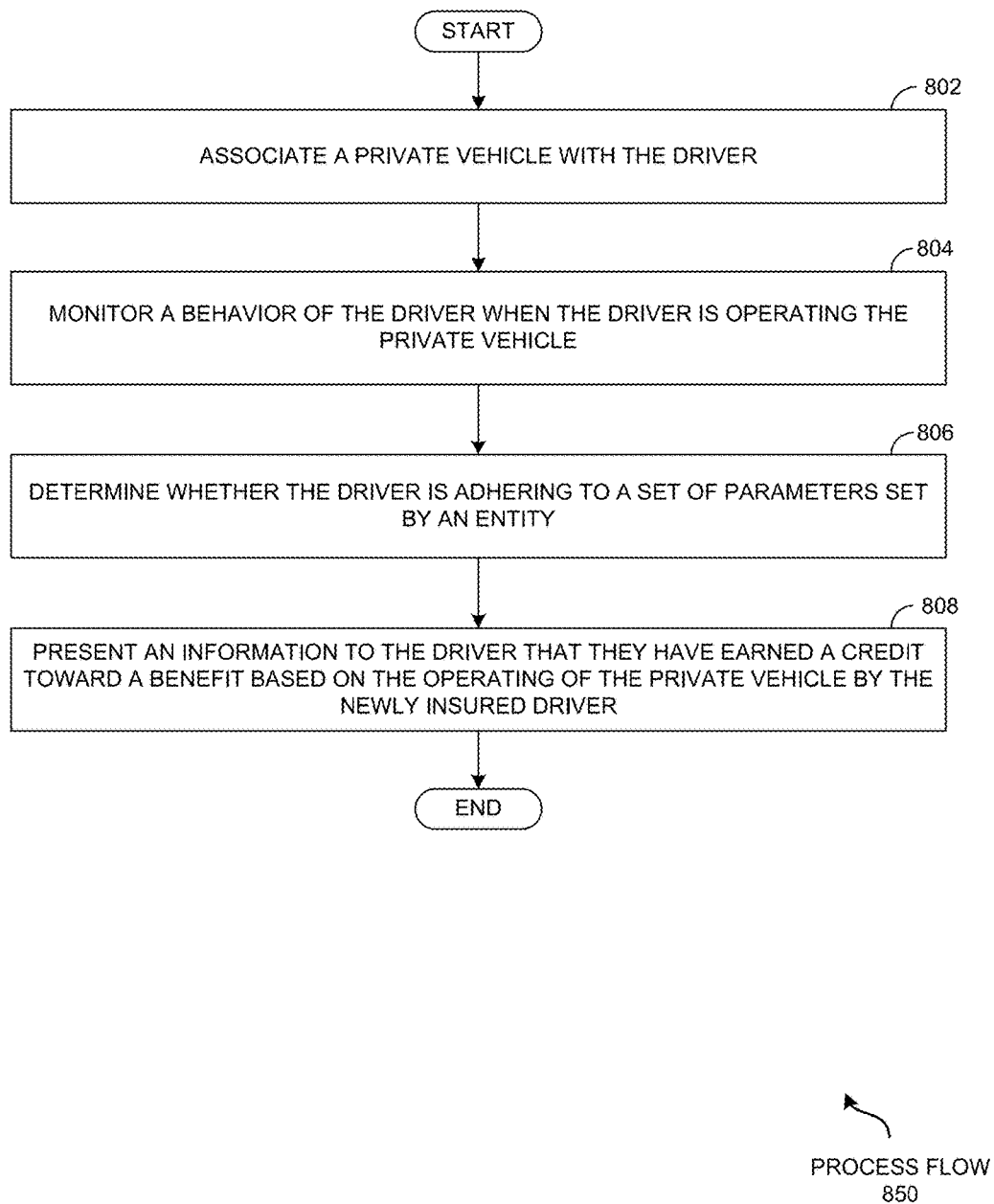
FIG. 8 is a process flow to determine whether the driver is adhering to the set of parameters of FIG. 1A, according to at least one embodiment.

FIG. 8 is a process flow 850 of determining whether the driver 600 is adhering to the set of parameters 108, according to at least one embodiment. In operation 802, the private vehicle 104 may be associated with the driver 600. In operation 804, the behavior of the driver 600 may be monitored when the driver 600 is operating the private vehicle 104. In operation 806, an entity may determine whether the driver 600 is adhering to a set of parameters 108. In operation 808, the driver 600 may be presented with information that they have earned a credit toward a benefit based on the operating of the private vehicle 104 by the newly insured driver 102.

Figure 9:
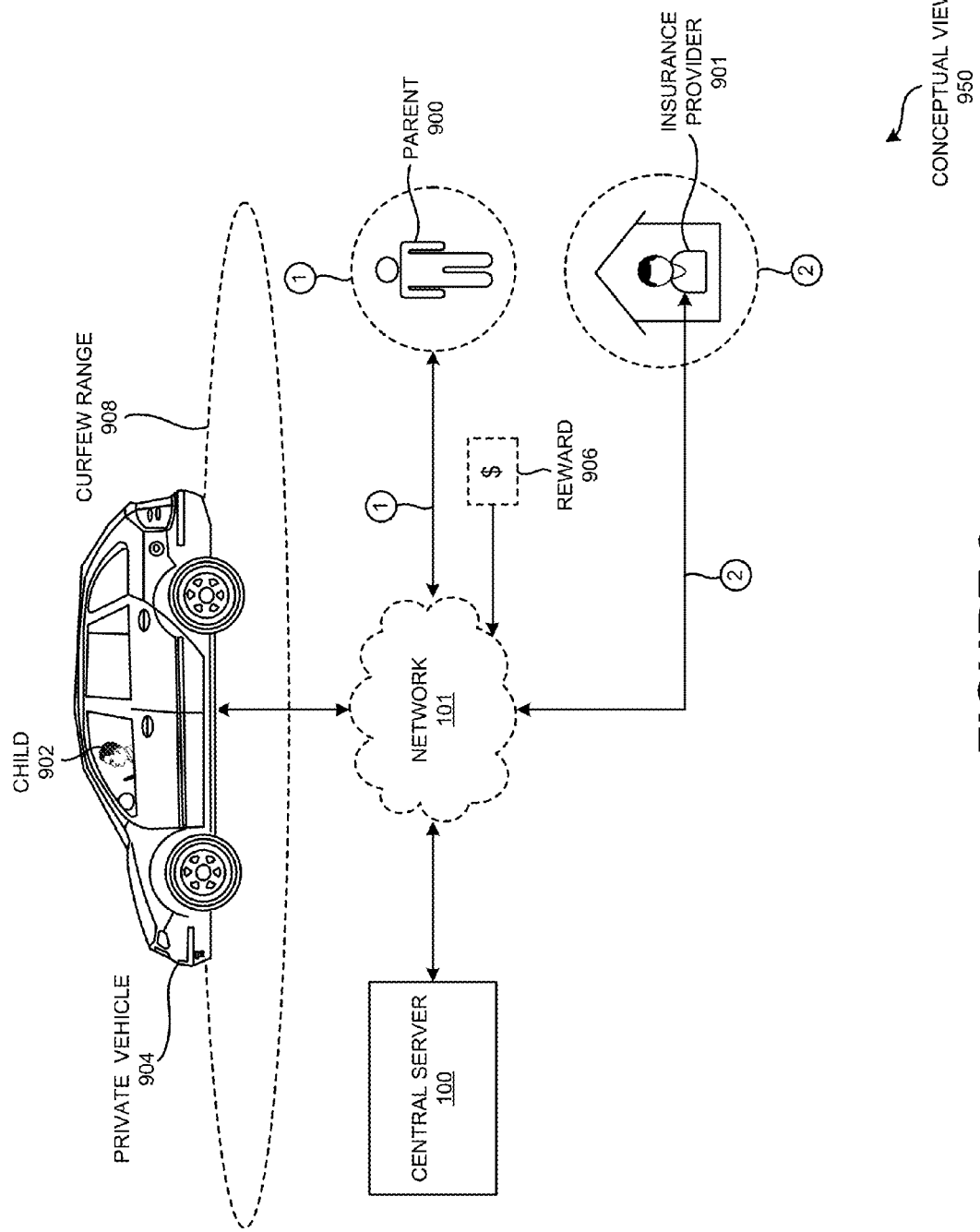
FIG. 9 is a conceptual view of a reward being presented to an individual by a parent or an insurance provider if a child or an individual remains within a curfew range, according to at least one embodiment.

FIG. 9 is a conceptual view 950 of a reward 906 offered to a child 902 based on a driving behavior of a private vehicle 904, according to one embodiment. Particularly, FIG. 9 illustrates two different scenarios represented by scenario '1' and scenario '2'. In scenario '1', the parent 900 may set the curfew range 908 communicated through the network 101 to the computer server 100 for the child 902 driving the newly gifted private vehicle 904, according to one embodiment. The child 902 may be rewarded (e.g., school bag, new dress) for adhering to the curfew range 908 set by the parent 900, according to one embodiment.

In scenario '2', the insurance provider 901 may set the curfew range 908 communicated through the network 101 to the computer server 100 for the child 902 (e.g., an insured driver, student, etc.) driving the private vehicle 904, according to one embodiment. The child 902 (e.g., an insured driver, student, etc.) may be rewarded (e.g., discount on premium, reduce the deductible) for adhering to the curfew range 908 set by the insurance provider 901, according to one embodiment.

An example embodiment will now be described. Mr. and Mrs. Smith may have recently gifted their son Peter a new car. Peter's driving behavior may have been a cause of concern for his father. For example, young Peter has been found to be speeding a few times while racing with his peers without their knowledge. He may have been provided with a warning from the police to not to over-speed. As a result, Mr. Smith decides to use the Spireon's curfew range application (e.g., accessible on a website link) to monitor Peter's driving behavior.

Mr. and Mrs. Smith define a set of rules that Peter will have to follow so that his driving is not restricted. Particularly, Mr. Smith decides that if Peter will have to follow traffic rules, then he should not drive after 11 pm. Mr. Smith also decides that Peter should remain within 100 miles from their home in Napa Calif. and should not exceed a speed limit of 60 mph. With these conditions, Peter will be given incentives in the form of a weekend treat or an extra allowance for shopping. The last month's driving record obtained from the Spireon's curfew range application, Peter was found obeying the rules. Hence, he was rewarded for his good driving behavior.

In another example, Lisa White recently bought insurance for her Honda Civic car from Safeco Insurance. Safeco has promised a discount on premiums if Lisa permits Safeco to install a Spireon tracking device in her car so that they can monitor her driving behavior remotely and determine an associated level of risk. Lisa drives within the speed limit, breaks gradually, and drives within the authorized curfew range. The Safeco Insurance Company may use the Spireon's insurance application (e.g., accessible on a website link) to monitor Lisa's driving behavior. The insurance company automatically determines that Lisa has been driving safely and abiding with the rules set by Safeco Insurance Company. For this, she is rewarded with the discount on premiums by 20% quarterly.

Figure 10:
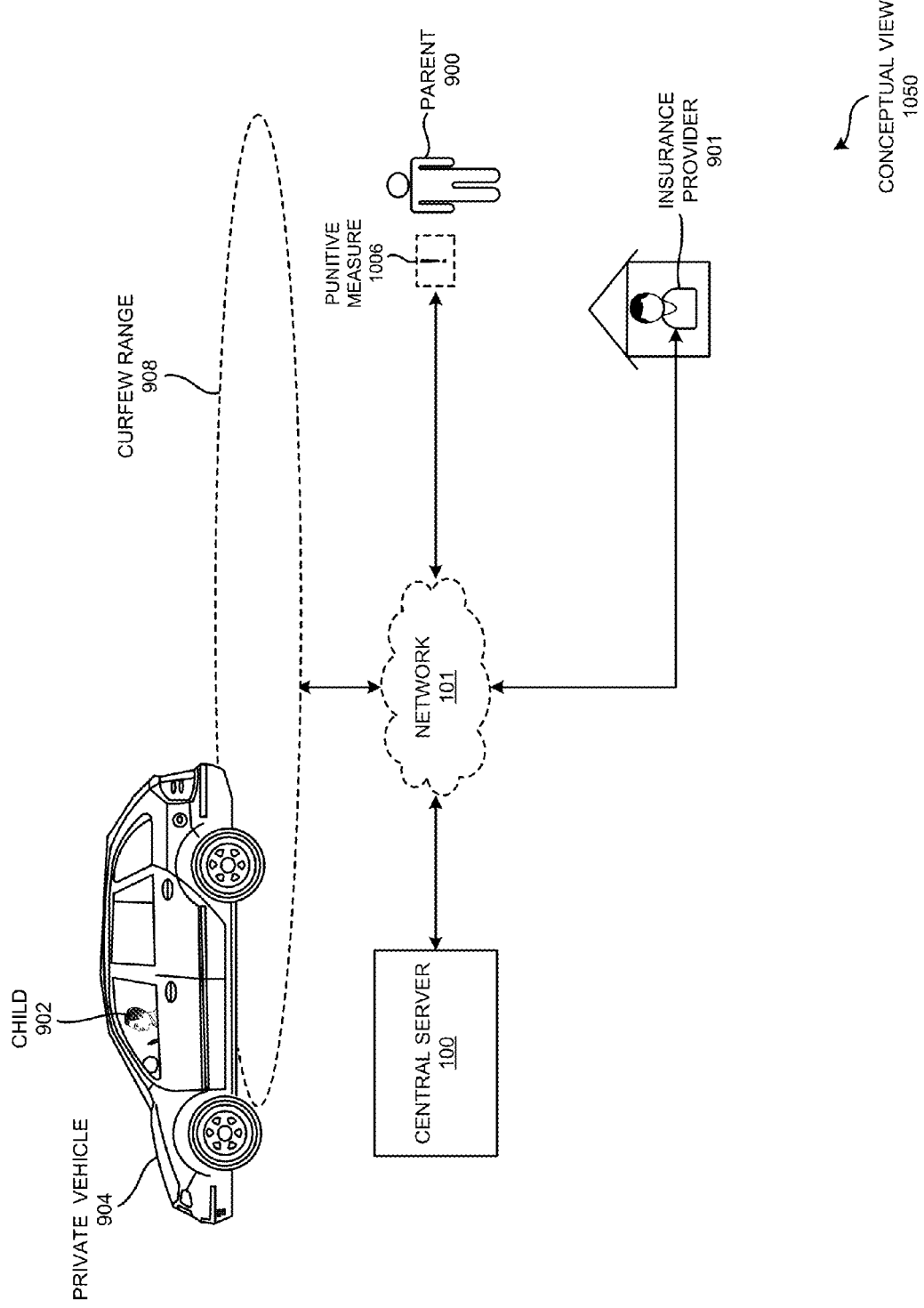
FIG. 10 is a conceptual view of a punitive measure being applied to the individual by the parent or the insurance provider if the individual travels outside the curfew range, according to at least one embodiment.

FIG. 10 is a conceptual view 1050 of a punitive measure 1006 being applied to the child 902 based on a driving behavior of a private vehicle 904, according to one embodiment. Particularly, FIG. 10 illustrates two different scenarios represented by scenario '1' and scenario '2'. In scenario '1', the parent 900 may be upset as the child 902 has breached the curfew range (e.g., exceeding the speed limit, driving after 12 pm, moving outside of the specified area), according to one embodiment. As a punitive measure 1006, the child may be penalized (e.g., cancellation of special weekend treat, cancelling vacations) by the parent 900 communicated through the network 101 to the computer server 100, according to one embodiment.

In scenario '2', the insurance provider 901 may penalize (e.g., increase the deductible, cancelling the discount on the premium, etc.) the child 902 (e.g., an insured driver, student, etc.), according to one embodiment.

In one example, Joe's son Ricky is moving out to another city for further education. Ricky's parent Joe knows about his son's erratic driving patterns and swerving across lanes after getting drunk and partying with friends. Joe warned Ricky several times about this behavior but Ricky has never obeyed. To keep Ricky safe, Joe decided to install a family car tracker sensor system in Ricky's car. Joe then used the Spireon's family security application website to monitor Ricky driving behaviors and receive alerts when Ricky is driving poorly. Joe is notified that Ricky has been driving against the driving parameters set by Joe. As a result, Joe has now reduced Ricky's fuel allowance by 20% for a month. Ricky has reduced his alcohol consumption, and has decided to come home earlier each night to maintain his allowance. Joe is delighted that his son is now safer thanks to the family security sensor technologies provided by Spireon.

In yet another example, Smart Drive Insurance Company loaned a Chevrolet Cruise in the name of Miss Rachael Wenzel for a period of 3 months when her primary car was totaled in a high speed crash into a traffic signal. Smart Drive Insurance installs and discloses to Ms. Wenzel a tracking sensor and technology by Spireon (as described in the various FIGS. 1-13 described herein) that has been installed in the loaner car. The sensor and related application used by Smart Drive remotely determines that Miss Wenzel often falls asleep at the wheel on her way back from the night shift at McDonald's and begins swerving. Now assessing a larger risk in insuring Miss Wenzel because of her risk of sleeping at the wheel and causing great bodily and property damage, Smart Drive increases a premium of 20% monthly for Miss Wenzel unless she stops driving at night. Miss Wenzel opts for carpooling from work during her graveyard shift, and precious lives are saved.

Figure 11:
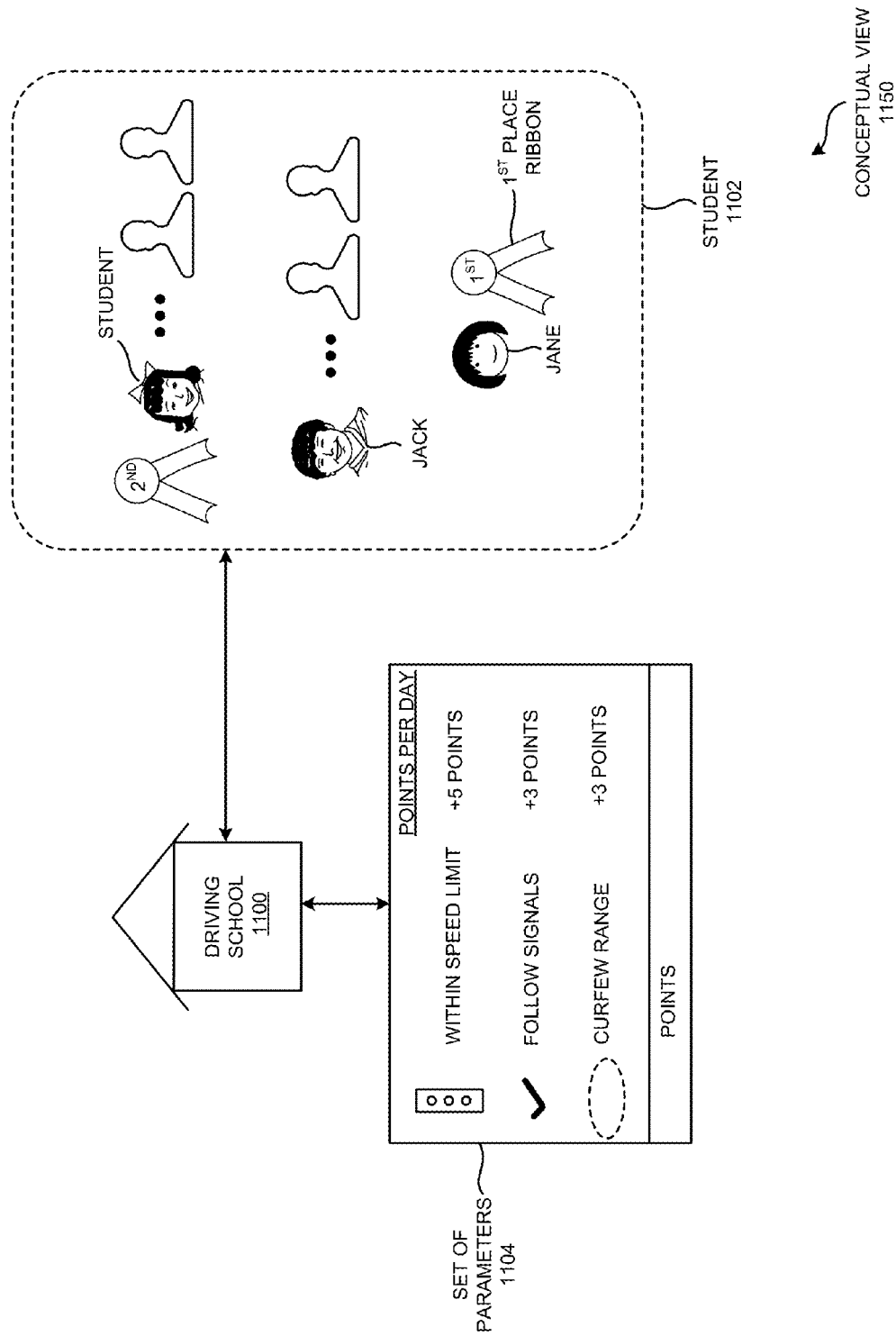
FIG. 11 is a conceptual view of a competition between the students of a driving school based on a set of parameters set by the driving school, according to at least one embodiment.

FIG. 11 is a conceptual view 1150 of a competition between the students 1102 of a driving school 1100 based on the set of parameters 1104 set by the driving school 1100, according to one embodiment. Particularly, FIG. 11 illustrates the competition organized by the driving school 1100 for the students 1102 based on the set of parameters 1104, according to one embodiment. The driving school 1100 is rewarding the students 1102 based on their driving behavior for the recognition of the best driver, according to one embodiment. In the embodiment illustrated in FIG. 11, the driving school 1100 will monitor the students 1102 for following the traffic rules, driving within curfew range, not exceeding speed limit for a specified period of time (e.g., a week, a month) and will award the best driver for adhering to each of the set parameters 1104 with maximum points.

In another example, ACME Driving School has decided to organize a competition among its students to promote safe driving. The Spireon tracking technology is installed into each car of each student at the ACME driving school. Further, the Spireon's tracking application is used to monitor the driving behaviors of all the students based on the given parameters. The parameters include adherence to traffic rules, driving within curfew range, and driving within speed limit, etc.

As an example, John, George, Kam, Cynthia, Kristin, and Monica are the students of ACME Driving School participating in the competition. As monitored by the Spireon's application, after competition, John was found over speeding his vehicle, whereas others were maintaining the speed limit. All the students of the driving school were driving within the boundaries of the curfew range, except Cynthia and Kam. George and John's vehicle was found in a damaged condition due to poor driving. Kristin was following all the parameters but accidently broke the traffic laws twice by accelerating at a high rate of speed. Those that drove within guidelines were awarded points each day for good driving behaviors, while those who did not follow driving guidelines did not earn points. Among all the students, Monica was awarded with the highest points for following all the driving parameters and was selected as a best driver of the driving school. Hence, the friendly competition among students helped to develop safe driving habits thanks to the embodiments described in FIGS. 1-13.

Figure 12:
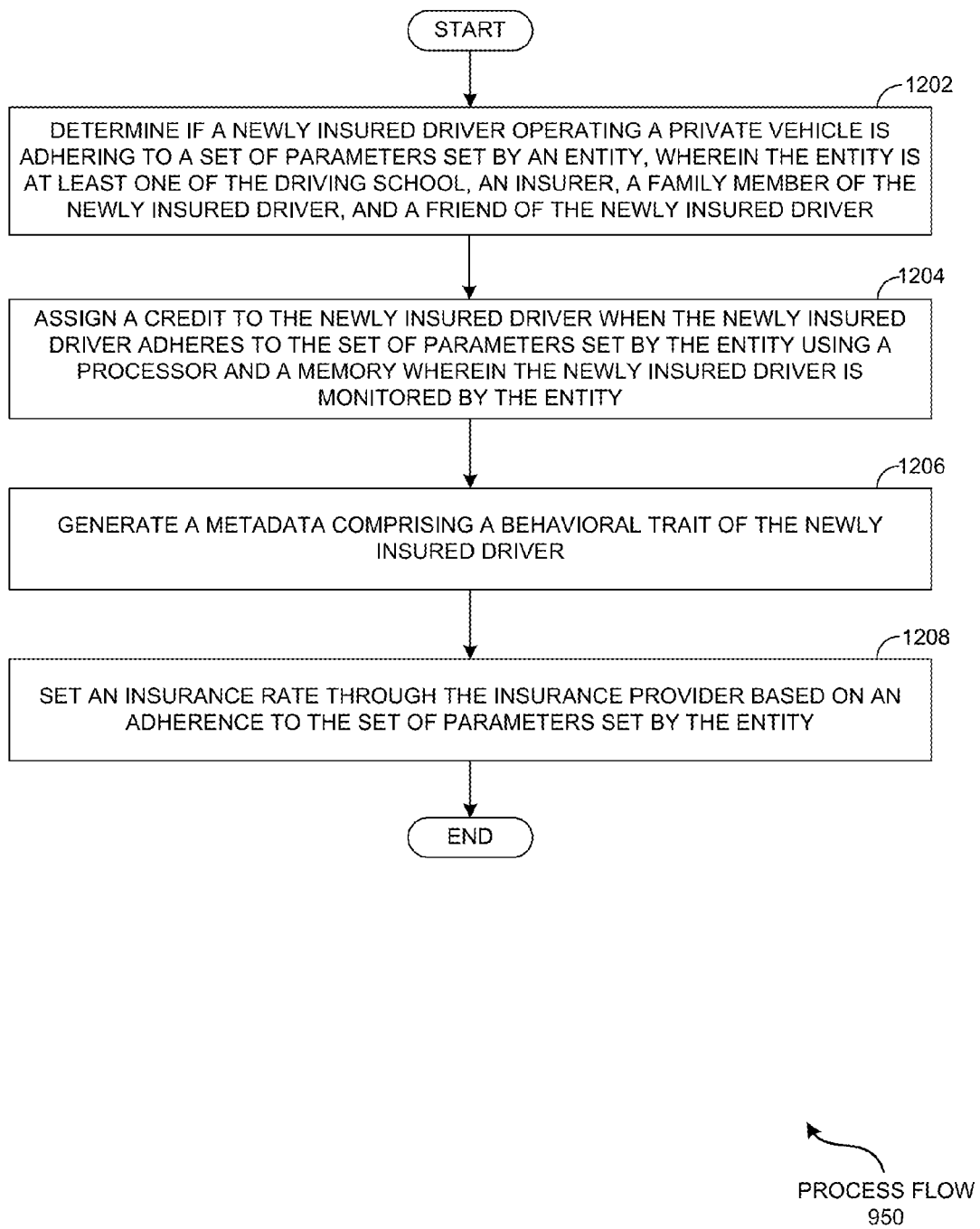
FIG. 12 is process flow of setting an insurance rate by an insurance provider, according to at least one embodiment.

FIG. 12 is process flow 1250 of setting an insurance rate through an insurance provider 110B, according to at least one embodiment. In operation 1202, it may be determined if a newly insured driver 102 operating a private vehicle 104 is adhering to a set of parameters 108 set by an entity, wherein the entity is at least one of the driving school user 110A, an insurance provider 110B and a family member 110C of the newly insured driver.

In operation 1204, a credit 302 may be assigned to the newly insured driver 102 when the newly insured driver 102 adheres to the set of parameters 108 set by the entity using a processor 114 and a memory 116 wherein the newly insured driver 102 is monitored by the entity. In operation 1206, a generated metadata 120 may include a behavioral trait of the newly insured driver 102. In operation 1208, an insurance rate may be set through the insurer based on an adherence to the set of parameters 108 set by the entity.

Figure 13:
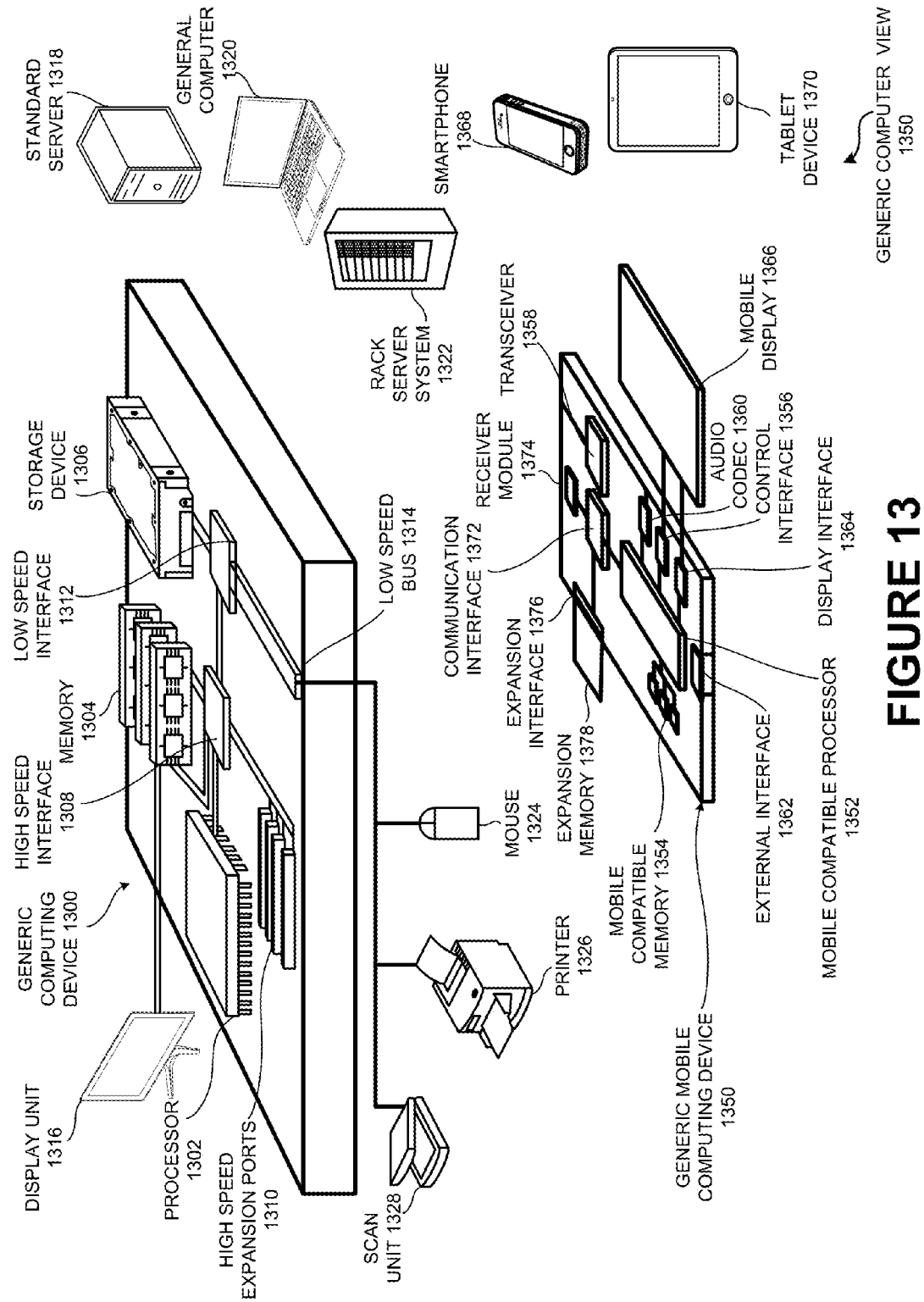
FIG. 13 is a schematic diagram of exemplary data processing devices that can be used to implement the methods and systems disclosed herein, according to at least one embodiment.

FIG. 13 is a schematic diagram of computing device 1300 that can be used to implement the methods and systems disclosed herein, according to one or more embodiments. FIG. 13 is a schematic of a computing device 1300 and a mobile device 1350 that can be used to perform and/or implement any of the embodiments disclosed herein. In one or more embodiments, computer server 100 and/or client device 103 of FIG. 1A may be the computing device 1300.

The computing device 1300 may represent various forms of digital computers, such as laptops, desktops, workstations, personal digital assistants, servers, blade servers, mainframes, and/or other appropriate computers. The mobile device 1350 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 1300 may include a processor 1302, a memory 1304, a storage device 1306, a high speed interface 1308 coupled to the memory 1304 and a plurality of high speed expansion ports 1310, and a low speed interface 1312 coupled to a low speed bus 1314 and a storage device 1306. In one embodiment, each of the components heretofore may be inter-coupled using various buses, and may be mounted on a common motherboard and/or in other manners as appropriate. The processor 1302 may process instructions for execution in the computing device 1300, including instructions stored in the memory 1304 and/or on the storage device 1306 to display a graphical information for a GUI on an external input/output device, such as a display unit 1316 coupled to the high speed interface 1308.

In other embodiments, multiple processors and/or multiple buses may be used, as appropriate, along with multiple memories and/or types of memory. Also, a plurality of computing device 1300 may be coupled with, with each device providing portions of the necessary operations (e.g., as a server bank, a group of blade servers, and/or a multi-processor system).

The memory 1304 may be coupled to the computing device 1300. In one embodiment, the memory 1304 may be a volatile memory. In another embodiment, the memory 1304 may be a non-volatile memory. The memory 1304 may also be another form of computer-readable medium, such as a magnetic and/or an optical disk. The storage device 1306 may be capable of providing mass storage for the computing device 1300. In one embodiment, the storage device 1306 may be comprised of at least one of a floppy disk device, a hard disk device, an optical disk device, a tape device, a flash memory and/or other similar solid state memory device. In another embodiment, the storage device 1306 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 1304, the storage device 1306, a memory coupled to the processor 1302, and/or a propagated signal.

The high speed interface 1308 may manage bandwidth-intensive operations for the computing device 1300, while the low speed interface 1312 may manage lower bandwidth-intensive operations. Such allocation of functions is exemplary only. In one embodiment, the high speed interface 1308 may be coupled to at least one of the memory 1304, the display unit 1316 (e.g., through a graphics processor and/or an accelerator), and to the plurality of high speed expansion ports 1310, which may accept various expansion cards.

In the embodiment, the low speed interface 1312 may be coupled to at least one of the storage device 1306 and the low speed bus 1314. The low speed bus 1314 may be comprised of a wired and/or wireless communication port (e.g., a Universal Serial Bus ("USB"), a Bluetooth® port, an Ethernet port, and/or a wireless Ethernet port). The low speed bus 1314 may also be coupled to at least one of scan unit 1328, a printer 1326, a keyboard, a mouse 1324, and a networking device (e.g., a switch and/or a router) through a network adapter.

The computing device 1300 may be implemented in a number of different forms, as shown in the figure. In one embodiment, the computing device 1300 may be implemented as a standard server 1318 and/or a group of such servers. In another embodiment, the computing device 1300 may be implemented as part of a rack server system 1322. In yet another embodiment, the computing device 1300 may be implemented as a general computer 1320 such as a laptop or desktop computer. Alternatively, a component from the computing device 1300 may be combined with another component in a mobile device 1350. In one or more embodiments, an entire system may be made up of a plurality of computing device 1300 and/or a plurality of computing device 1300 coupled to a plurality of mobile device 1350.

In one embodiment, the mobile device 1350 may comprise at least one of a mobile compatible processor 1352, a mobile compatible memory 1354, and an input/output device such as a mobile display 1366, a communication interface 1372, and a transceiver 1358, among other components. The mobile device 1350 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 1352 may execute instructions in the mobile device 1350, including instructions stored in the mobile compatible memory 1354. The mobile compatible processor 1352 may be implemented as a chipset of chips that include separate and multiple analog and digital processors. The mobile compatible processor 1352 may provide, for example, for coordination of the other components of the mobile device 1350, such as control of user interfaces, applications run by the mobile device 1350, and wireless communication by the mobile device 1350.

The mobile compatible processor 1352 may communicate with a user through the control interface 1356 and the display interface 1364 coupled to a mobile display 1366. In one embodiment, the mobile display 1366 may be at least one of a Thin-Film-Transistor Liquid Crystal Display ("TFT LCD"), an Organic Light Emitting Diode ("OLED") display, and another appropriate display technology. The display interface 1364 may comprise appropriate circuitry for driving the mobile display 1366 to present graphical and other information to a user. The control interface 1356 may receive commands from a user and convert them for submission to the mobile compatible processor 1352.

In addition, an external interface 1362 may be provide in communication with the mobile compatible processor 1352, so as to enable near area communication of the mobile device 1350 with other devices. External interface 1362 may provide, for example, for wired communication in some embodiments, or for wireless communication in other embodiments, and multiple interfaces may also be used.

The mobile compatible memory 1354 may be coupled to the mobile device 1350. The mobile compatible memory 1354 may be implemented as at least one of a volatile memory and a non-volatile memory. The expansion memory 1378 may also be coupled to the mobile device 1350 through the expansion interface 1376, which may comprise, for example, a Single In Line Memory Module ("SIMM") card interface. The expansion memory 1378 may provide extra storage space for the mobile device 1350, or may also store an application or other information for the mobile device 1350.

Specifically, the expansion memory 1378 may comprise instructions to carry out the processes described above. The expansion memory 1378 may also comprise secure information. For example, the expansion memory 1378 may be provided as a security module for the mobile device 1350, and may be programmed with instructions that permit secure use of the mobile device 1350. In addition, a secure application may be provided on the SIMM card, along with additional information, such as placing identifying information on the SIMM card in a non-hackable manner.

The mobile compatible memory may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 1354, the expansion memory 1378, a memory coupled to the mobile compatible processor 1352, and a propagated signal that may be received, for example, over the transceiver 1358 and/or the external interface 1362.

The mobile device 1350 may communicate wirelessly through the communication interface 1372, which may be comprised of a digital signal processing circuitry. The communication interface 1372 may provide for communications using various modes and/or protocols, such as, at least one of: a Global System for Mobile Communications ("GSM") protocol, a Short Message Service ("SMS") protocol, an Enhanced Messaging System ("EMS") protocol, a Multi-media Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1358 (e.g., radio-frequency transceiver). In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 1350, which may be used as appropriate by a software application running on the mobile device 1350.

The mobile device 1350 may also communicate audibly using an audio codec 1360, which may receive spoken information from a user and convert it to usable digital information. The audio codec 1360 may likewise generate audible sound for a user, such as through a speaker (e.g., in a handset of the mobile device 1350). Such a sound may comprise a sound from a voice telephone call, a recorded sound (e.g., a voice message, a music files, etc.) and may also include a sound generated by an application operating on the mobile device 1350.

The mobile device 1350 may be implemented in a number of different forms, as shown in the figure. In one embodiment, the mobile device 1350 may be implemented as a smartphone 1368. In another embodiment, the mobile device 1350 may be implemented as a personal digital assistant ("PDA"). In yet another embodiment, the mobile device, 1350 may be implemented as a tablet device 1370.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 724 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A driver monitoring apparatus comprising:
 a set of sensors disposed in a vehicle, the sensors comprising:
  a GPS receiver for generating geospatial location information indicating a geospatial location of the vehicle;
  one or more condition sensors for generating operational condition information indicating one or more operational conditions of the vehicle; and
  a communication device for communicating the geospatial location information and operational condition information through a communication network;
 a first client device in communication with the communication network, the first client device for configuring a set of parameters to which operation of the vehicle is to adhere;
 a second client device in communication with the communication network, the second client device associated with a driver of the vehicle;

a third client device in communication with the communication network, the third client device associated with an advertiser; and a computer server in communication with the communication network, the computer server including one or more computers having instructions stored thereon that when executed cause the one or more computers:

to receive the geospatial location information and the operational condition information from the set of sensors in the vehicle via the communication network;

to receive the set of parameters from the first client device via the communication network;

to determine, based on comparison of one or more of the geospatial location information and the operational condition information to the set of parameters, whether operation of the vehicle is in adherence to the set of parameters, to generate metadata indicative of a behavioral trait of the driver as indicated by whether the operation of the vehicle by the driver is in adherence to the set of parameters, wherein the behavioral trait is an action observed in driving patterns of the driver, to select the advertiser for targeting the behavioral trait of the driver in promotion of at least one of a product and a service, and to communicate an advertising opportunity function to the third client device associated with the advertiser, the advertising opportunity function providing the advertiser information needed to advertise to the driver through the second client device.

2. The driver monitoring apparatus of claim 1 wherein the computer server includes one or more computers having instructions stored thereon that when executed cause the one or more computers to provide a punitive measure when operation of the vehicle is not in adherence to the set of parameters.

3. The driver monitoring apparatus of claim 1 wherein the computer server includes one or more computers having instructions stored thereon that when executed cause the one or more computers:

to set a curfew range on the vehicle to which movement of the vehicle is to be limited, and to determine, based on the geospatial location information, whether the vehicle has traveled beyond the curfew range.

4. The driver monitoring apparatus of claim 1 wherein the computer server includes one or more computers having instructions stored thereon that when executed cause the one or more computers:

to assign a credit to a driver of the vehicle when the operation of the vehicle is in adherence with the set of parameters set, and to communicate information to a mobile device of the driver via the communication network indicating that the credit has been assigned to the driver.

5. The driver monitoring apparatus of claim 1 wherein the operational condition information includes one or more of fuel level, radiator temperature, battery level, and air pressure.

6. The driver monitoring apparatus of claim 1 wherein the client device comprises a smartphone, a tablet computer, or a laptop computer.

7. The driver monitoring apparatus of claim 1 wherein the client device is operational to configure the set of parameters including one or more of a speed limit, a distance driven per time interval limit, a curfew time range, a maximum distance limit, adherence to traffic rules, hard braking, and vehicle condition.

8. A method of monitoring a vehicle comprising:

sensing a geospatial location of the vehicle using a GPS sensor disposed in the vehicle;

sensing one or more operational conditions of the vehicle using one or more condition sensors disposed in the vehicle;

communicating information indicative of the geospatial location and operational condition of the vehicle using a communication device disposed in the vehicle and in communication with a communication network;

configuring a set of parameters to which operation of the vehicle is to adhere, the configuring performed using a first client device in communication with the communication network;

determining, based on comparison of one or more of the geospatial location and the operational condition to the set of parameters, whether operation of the vehicle is in adherence to the set of parameters, the determining performed by execution of instructions by a server computer in communication with the communication network;

generating metadata indicative of a behavioral trait of the driver as indicated by whether the operation of the vehicle by the driver is in adherence to the set of parameters, wherein the behavioral trait is an action that is observed in driving patterns of the driver, the generating performed at least in part by execution of instructions by the server computer;

selecting an advertiser for targeting the behavioral trait in promotion of at least one of a product and a service, the selecting performed at least in part by execution of instructions by the server computer; and communicating an advertising opportunity function to a third client device associated with the advertiser, the advertising opportunity function providing to the advertiser information needed to advertise to the driver through a second client device associated with the driver, the communicating performed at least in part by execution of instructions by the server computer.

9. The method of claim 8 further comprising providing a punitive measure when operation of the vehicle is not in adherence to the set of parameters, the providing performed by execution of instructions by the server computer.

10. The method of claim 8 further comprising:

setting a curfew range to which movement of the vehicle is limited, the setting performed by execution of instructions by the server computer; and monitoring the geospatial location of the vehicle to determine whether the vehicle has traveled beyond the curfew range, the monitoring performed by execution of instructions by the server computer.

11. The method of claim 8 further comprising:

assigning a credit to a driver of the vehicle based on operation of the vehicle being in adherence to the set of parameters, the assigning performed by execution of instructions by the server computer; and communicating to a mobile device of the driver information indicating that the driver has earned the credit toward a benefit based on the operating of the private vehicle by the driver.

12. A driver monitoring apparatus comprising:

a set of sensors disposed in a vehicle, the sensors comprising:

a GPS receiver for generating geospatial location information indicating a geospatial location of the vehicle;

one or more condition sensors for generating operational condition information indicating one or more operational conditions of the vehicle; and a communication device for communicating the geospatial location information and operational condition information through a communication network;

a first client device in communication with the communication network, the first client device for configuring a set of parameters to which operation of the vehicle is to adhere;

a second client device in communication with the communication network, the second client device associated with a driver of the vehicle;

a computer server in communication with the communication network, the computer server including one or more computers having instructions stored thereon that when executed cause the one or more computers:

to receive the geospatial location information and the operational condition information from the set of sensors in the vehicle via the communication network;

to receive the set of parameters from the first client device via the communication network;

to determine, based on comparison of one or more of the geospatial location information and the operational condition information to the set of parameters, whether operation of the vehicle is in adherence to the set of parameters;

to execute a credit function to determine a credit toward a benefit to be assigned to the driver of the vehicle when the operation of the vehicle is in adherence with the set of parameters set;

to execute a punitive measure function to determine a punitive measure to be applied to the driver of the vehicle when the operation of the vehicle is not in adherence to the set of parameters; and to communicate information to the second client device via the communication network indicating that the credit has been assigned or a punitive measure has been applied to the driver.

* * * * *